United States Patent [19]

Smith et al.

[11] Patent Number: 4,685,149
[45] Date of Patent: * Aug. 4, 1987

[54] METEOR SCATTER BURST COMMUNICATION SYSTEM

[75] Inventors: Dale K. Smith, Benton; Thomas G. Donich, Federal Way; Bobby V. Dickerson, Maple Valley; Raymond E. Leader, Seattle, all of Wash.

[73] Assignee: Rockwell International Corporation, El Segundo, Calif.

[*] Notice: The portion of the term of this patent subsequent to Jul. 7, 1998 has been disclaimed.

[21] Appl. No.: 236,353

[22] Filed: Feb. 20, 1981

Related U.S. Application Data

[62] Division of Ser. No. 820,206, Jul. 29, 1977, Pat. No. 4,277,845.

[51] Int. Cl.⁴ .............................................. H04B 1/38
[52] U.S. Cl. ....................................... 455/56; 455/52; 455/64; 455/69; 340/825.08; 340/825.54
[58] Field of Search ................. 455/56, 2, 52, 57, 53, 455/54, 64, 69, 88, 49; 343/18 R, 18 D, 18 E; 340/825.03, 825.04, 825.07, 825.08, 825.52, 825.53, 825.54, 311.1, 313

[56] References Cited

U.S. PATENT DOCUMENTS

| | | | |
|---|---|---|---|
| 3,069,657 | 12/1962 | Green | 340/825.53 |
| 3,351,859 | 11/1967 | Groth, Jr. | 455/52 |
| 3,445,815 | 5/1969 | Saltzberg | 340/825.54 |
| 3,531,772 | 9/1970 | Dalyai | 340/825.08 |
| 4,081,612 | 3/1978 | Hafner | 340/825.52 |
| 4,100,533 | 7/1978 | Napolitano | 340/825.08 |
| 4,131,881 | 12/1978 | Robinson | 340/825.53 |
| 4,277,845 | 7/1981 | Smith et al. | 455/52 |
| 4,630,314 | 12/1986 | Smith | 455/64 |

Primary Examiner—Tommy P. Chin
Attorney, Agent, or Firm—V. Lawrence Sewell; Howard R. Greenberg; H. Frederick Hamann

[57] ABSTRACT

The specification discloses a meteor burst communication system including at least two spaced apart master stations, in association with a plurality of groups of remote stations spaced at locations remote from the master stations, with each group being associated with one of the master stations. Each of the master stations incudes a radio transmitter for transmitting probing digital radio signals having address portions which are directed from the master station for reflection from meteor trails to the remote stations associated with the master station. Circuitry is provided to vary the length of the address portions transmitted by the master station in dependence upon desired signal-to-noise and timing considerations. Each of the remote stations includes a radio receiver for receiving the reflected probing digital radio signals from the master stations. Each of the remote stations also includes at least one sensor of physical characteristics such as snow depth, rain fall or the like. The remote stations further include a predetermined unique digital address sequence stored therein and include circuitry to compare the received address portions from the master station with the stored digital address sequence. The remote stations each include a transmitter for transmitting digital data representative of the output of the associated sensor to the master station via reflection from a meteor vapor trail, if the received address portion compares with the stored digital address sequence in accordance with predetermined criteria.

5 Claims, 27 Drawing Figures

METEOR SCATTER BURST COMMUNICATION SYSTEM

This is a division of application Ser. No. 820,206, filed 7/29/77 now U.S. Pat. No. 4,277,845.

FIELD OF THE INVENTION

This invention relates to digital communication systems, and more particularly relates to a meteor scatter burst communications system utilizing a plurality of remote data terminals.

THE PRIOR ART

In numerous applications, it is desirable to transmit information from a master station to one or more remote stations over such long distances that it is not possible to interconnect the master station with the remote stations by wires and wherein it is not practical to use conventional radio communication systems. It has been previously known to conduct such remote data transmission utilizing orbiting satellite stations. However, the use of such satellite stations is expensive and is often impractical due to the limited number of such satellite stations available.

It has thus also been previously known to utilize meteor scatter techniques, commonly termed meteor burst communications, in order to enable radio communication over long distances. Such meteor burst communication utilizes the generation of radio waves in the low VHF frequency range from a master station and includes the reflection of such radio waves from electrons in meteor trails. The reflected radio waves may then be detected by remote stations for distances greater than 1000 miles. Inasmuch as such meteor trails usually exist only for a few milliseconds to a few seconds, a burst transmission mode is commonly used in such techniques. Because the availability of properly oriented, suitably ionized meteor trails varies with the time of day and the month of the year, such systems require the proper selection of operating frequencies and design parameters for consistent practical performance.

Numerous governmental agencies have developed and experimented with meteor burst communications for the past 25 years. In the 1960's, a two way experimental meteor burst communications link was developed by Montana State University for the Bonneville Power Administration. This Bonneville Power Administration system demonstrated the practical capability of meteor bursts in the gathering of hydrometeoroligical data from a limited number of remote stations. Further, in 1974 and 1975, federal agencies in Alaska demonstrated the use of meteor burst communications to collect remote data in Alaska involving several remote data terminals.

While such prior developmental programs have indicated the general practicality of meteor burst communication systems, such prior systems have not utilized a large number of remote stations and have therefore not solved the many problems inherent in the selective polling of desired remote stations from as many as several hundred remote stations. Moreover, such prior systems have not been capable of obtaining a high resolution of data from a large number of remote stations while maintaining consistency and accuracy of data selection and have further not provided substantial flexibility in the selection of or polling of remote stations in order to obtain selected data. A need has thus arisen for a meteor burst communications system which enables continuous automatic collection of accurate sensor data from a large number of remote data collection stations. Such as system must be flexible to enable easy addition or elimination of remote station data collection points, and must include techniques to insure the accuracy and consistency of the collected data in varying transmission conditions. In particular, a need has arisen for a meteor burst communication system which may be utilized to collect weather data, such as temperature, snow depth, precipitation and river depth data, from a plurality of remote and relatively inaccessible remote stations on a continual basis in order to assist in various weather projections.

SUMMARY OF THE INVENTION

In accordance with the present invention, a meteor burst communication system is provided which enables automatic and accurate communication with any selected one or a group of a large number of remote stations under varying transmission conditions.

In accordance with the present invention, a system for meteor burst communication includes circuitry for generating polling or probing codes from a master station. Reflections of the polling code from meteor trails are received at a multiplicity of remote stations. Response signal are transmitted from each of the remote stations having an address included in the polling codes. Circuitry is provided to vary the length of the polling code transmitted by the master station in dependence upon the remote stations generating response signals.

In accordance with another aspect of the invention, a meteor burst communication system includes at least one master station and a plurality of remote stations spaced at locations from the master station. The master station includes a radio transmitter for transmitting probing digital radio signals having address portions of selectively variable length. The probing digital radio signals are directed from the master station for reflection from meteor vapor trails to the remote stations. Each of the remote stations include a radio receiver for receiving the reflected probing digital radio signals from the master station. Each of the remote stations includes address recognition circuitry having a predetermined digital address sequence stored therein and further having circuitry for comparing the received address portions with the stored digital address sequence. At least one sensor physical characteristic is connected with each of the remote stations. Each remote station includes a transmitter for transmitting digital data representative of the output of the sensor to the master staton via reflection from a meteor vapor trail, if the received address portion compares with the stored digital address sequence in accordance with predetermined criteria based upon the length of the received address portion.

In accordance with another aspect of the invention, a meteor burst communication system includes a master station which intermittently contacts a plurality of remote stations. A digital probing radio signal is transmitted from the master station having an address field of n-bit capacity. A digital address is computed which has a number of bits up to n-bits dependent upon a desired number of remote stations to be contacted. Circuitry applies the digital address for transmission in the address field.

In accordance with yet another aspect of the present invention, a meteor burst communication system includes at least one master station and a plurality of remote stations based at locations from the master station. The master station includes a radio transmitter for transmitting probing digital radio signals. The digital radio signals are directed from the master station for reflection from meteor trails to the remote stations. Each of the remote stations includes a radio receiver for receiving the reflected probing radio signals from the master station. At least one sensor physical characteristic is connected with each remote station. Each remote station includes a transmitter for transmitting, at a specified frequency, digital data representative of the output of the sensor to the master station via reflection from a meteor trail. The master station includes a plurality of antennas connected to discrete radio receiving channels for simultaneously receiving digital data from a plurality of the remote stations. Circuitry is connected to the radio receiving channels for storing the received digital data for subsequent use.

In accordance with yet another aspect of the present invention, a meteor burst communication system includes at least two spaced apart master stations. A plurality of groups of remote stations are spaced at locations remote from the master stations and each group is associated with one of the master stations. Each of the master stations includes a radio transmitter for transmitting probing digital radio signals having address portions for being directed from the master station for reflection of meteor trails to the remote stations associated therewith. Each of the remote stations includes a radio receiver for receiving the reflected probing digital radio signals from the master stations. At least one sensor of physical characteristics is connected with each remote station. Each remote station includes a transmitter for transmitting digital data representative of the output of the sensor to the master station via reflection from a meteor trail. Circuitry is provided to detect when one master station receives a response from a remote station associated with another master station and for notifying the other master station to eliminate the requirement of further probing for the received remote station.

DESCRIPTION OF THE DRAWINGS

A more complete appreciation of the invention may be had by reference to the accompanying drawings, illustrating a preferred embodiment of the invention to be described in detail, wherein.

DESCRIPTION OF THE PREFERRED EMBODIMENT

Figure 1:
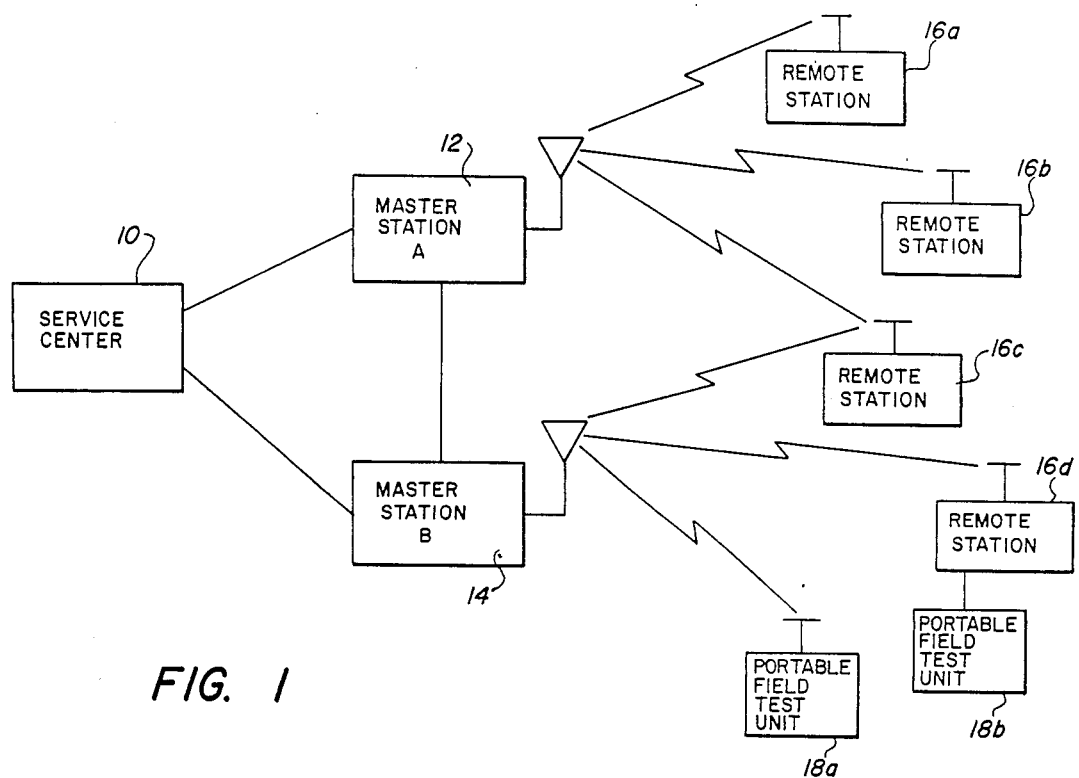
FIG. 1 is a general sysem diagram of the meteor burst communication system of the present invention.

Referring to FIG. 1, a somewhat diagrammatic block diagram is provided of the preferred embodiment of the present invention. A central service center is designated by the numeral 10 and serves to coordinate the operation of a master station A identified by the numeral 12 and a master station B identified by the numeral 14. Master stations A and B will generally be separated by relatively large distances in order to increase the area which is able to be covered by the present system. In a specific implementation of the present invention, the master station A was located in the vicinity of Ogden, Utah, while the master station B was situated in the vicinity of Boise, Idaho.

Each of the master stations 12 and 14 is generally responsible for polling and receiving information from a plurality of remote stations 16a-d which are located from a few miles from the master station to a maximum of approximately 800 miles from the master station. It will be understood that although four remote stations 16a-d are illustrated in FIG. 1, that in actual implementation of the invention large numbers of remote stations will generally be utilized, such as several hundred remote stations. Each of the remote stations includes one or more sensors which inputs data regarding physical characteristics such as precipitation level, temperature and the like. The remote stations, when properly addressed, transmit this data to a master station. The data may then be used to predict such important data such as the effects of precipitation and snowfall at remote sites on future water availability at other key areas. The remote stations are normally situated and organized into polling or probing groups within a circumference of 15 to 30 miles, for example. Each polling group is then addressed by the same meteor burst and each polling group is then sequentially addressed from the master station. This sequential polling or addressing of polling groups operates to prevent more than one site from responding simultaneously to the master station on the same meteor trail.

In addition, the invention contemplates the use of one or a plurality of portable field test units 18a-b. These portable field test units are adapted to be movable by a single operator into the remote areas wherein the remote station 16a-d are located. The portable field test units 18a-b contain circuitry for accomplishing diagnostic testing of the remote stations. In addition, as will be subsequently described, the portable field test units 18a-b include circuitry for enabling the operator to communicate via the system to either of the master stations 12 or 14.

The service center 10 operates to initiate the flow of information of the system by requesting a nominal, an ad-hoc or background poll or probe from both of the master stations 12 and 14. A nominal poll includes probing all remote stations associated with a master station.

An ad-hoc poll enables selective communication with any one or group of remote stations. A background poll is a general poll for communication with, for example, portable field test units. The master stations enter a predetermined probing schedule under software control for a fixed time period. At the remote stations 16a–d, data from a plurality of sensors generates new data and the new data is updated in a storage during a predetermined interval such as fifteen minutes and is stored in buffer storage. When the master station 12 or 14 generates a probing signal which is reflected from a meteor burst and is received by the remote station 16a–d, the transmitter of the remote station is turned on and digital data is sent via meteor reflection to the master station. If the master station receives the remote station's transmission and detects no errors in the message thereof, an acknowledge code is sent to that specific remote station. The remote station will then be inhibited from transmitting another response for a predetermined period of time or when a special command is transmitted by the master station.

Each of the master stations 12 and 14 includes a digital computer for generating the holding signals and for receiving and storing the data from the remote station 16a–d. In addition, the master stations may communicate with the portable field test units 18a–b and conversely the portable field test units 18a–b may transmit signals to the master stations. The computers of each master station are linked together by a communication channel so that the memories in each computer can recognize receipt of data from remote stations and can speed up the polling sequence. At the completion of a predetermined polling time, the received data from each master station is then transmitted to the service center 10 for further processing.

One advantage of the present system is its ability to poll or probe multiple remote stations at the same time. A digital signal burst generated by one of the master stations and reflected by a meteor trail projects only a small beam toward the remote station cites, thus providing a private data link. Therefore, different remote stations respond to different meteor trail reflections. If two remote stations are close in proximity, both could respond and therefore interfere with one another. The required separation between the remote stations 16a–d depends on the range to the closest master station and generally varies between 15 and 30 miles. Remote stations in close proximity to one another are generally assigned different polling address codes or are assigned to different master stations.

In the case of a nominal polling technique, each of the master stations 12 and 14 begins a predetermined probe sequence designed to interrogate all of the remote stations 16a–d in a timely manner. The remote stations are normally divided into polling groups and sequences to best accommodate the fastest response times. As the remote stations being polled respond, their data is stored in the master station computers and the remote status table in the computer is updated to indicate that the remote stations data has been collected. When all remote stations in a group have responded or the time allocated for polling a group expires, the probe sequence advances to the next group and polls the remote stations in that group. This polling continues until the polling sequence is complete, at which time the data collected is reported by both master stations by way of the communications link to a master computer at the service center 10.

An ad-hoc polling command from the service center 10 is a request to obtain data from specific remote stations. An important aspect of the present invention is the ability to select polling of any specific remote station or any group thereof. The way the master stations respond to the request from the service center 10 is a function of the system response time at the time of the request. During morning, year around, and evening hours of summer months, response times will normally be small enough to allow unique polling of the remote stations requested, so that the data collected may be transmitted to the service center 10. During evening hours of the winter months response times will normally be sufficiently increased to prevent gathering of ad-hoc data in a timely manner by unique remote polling. Therefore, during the evening hours of the winter months, the requested remote stations will be polled as part of larger group polls, therefore allowing several of the ad-hoc remote stations to be polled simultaneously, while also however polling many remote stations not requested in the ad-hoc polling. This will cause some remote stations to transmit more often than necessary, but will not degrade the overall system's performance. The master stations will keep track of the remote stations received and when the ad-hoc request is satisfied, will report the received data to the service center 10.

An important aspect of the invention is the automatic optimizing of the probing signals transmitted by the master stations. Each master station has an address field of ten bits in the probing signal. As the size of a group of remote stations to be polled increases, the number of bits transmitted in the address field decreases. Similarly, to customize a probing signal to one or a few remote stations, the number of bits used in the address field is increased. As will be subsequently be described in greater detail, the present system automatically adds or subtracts bits from the transmitted address field in order to optimize the probing signals relative to desired signal-to-noise and timing requirements.

The portable field test units 18a or 18b are capable of transmitting a 16 character alphanumeric message to either of the master stations 12 or 14 whenever the portable field test unit acquires the master polling signal. Likewise, any master station is capable of receiving and processing messages from either of the portable field test units 18a or 18b. Received messages may either be displayed to personnel at the master station or forwarded to the service center 10. Conversely, the service center 10 or the master station personnel can generate 16 character messages for transmission to a specific portable field test unit 18a or 18b. These messages may either be transmitted uniquely or applied via nominal, ad-hoc background polling sequences.

Figure 2:
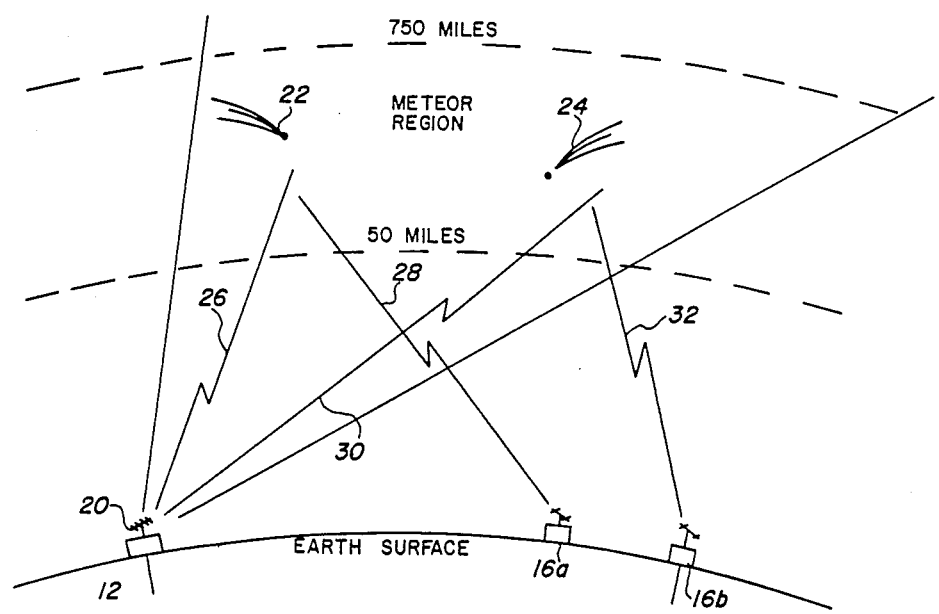
FIG. 2 is a diagrammatic illustration of meteor burst communication.

FIG. 2 illustrates somewhat diagrammatically the basic operation of the present meteor burst communication system. The master station 12 generates a PSK coded signal which requests a specific or group of data to respond, along with a coded message containing data. As illustrated in FIG. 2, this PSK coded signal is transmitted from an antenna 20 on the master station 12 upwardly over a predetermined angle. The transmitted signals are reflected downwardly by meteor vapor trails in the known manner. For example, FIG. 2 illustrates a meteor region in which meteor 22 and 24 occur at the time of transmission of a signal from the master station 12. Only signals generally following signal path 26 are reflected from the trail of the meteor 22. These signals are reflected generally along the path 28 and are received by the remote station 16a. Due to the relatively narrow angle of reflection, remote station 16b does not detect reflections from the trail of meteor 22. However, radio signals from the master station 12 following the general line 30 are reflected from he trail of meteor 24. These reflections follow the general path 32 and are detected by the remote station 16b.

Thus, as seen in FIG. 2, different remote stations respond to different meteor trails, thereby providing relatively private links. In order to prevent interference with such private links, the remote stations are generally separated by 15 to 30 miles. Remote stations in very close proximity will generally be assigned different polling address codes or assigned to different master stations.

The remote stations 16a and 16b are normally dormant with only their radio receivers activated. Whenever a properly addressed master station's polling signal is detected at the remote station receiver, and if the remote station is instructed to send data by the polling signal, the remote station's transmitter is switched on and data is sent.

Vertical horizon clearances at the master and remote stations are relatively critical since communications between the stations depends on ionized meteor trails, with the radio signals being either reflected or reradiated off the meteor trail most often at an obtuse angle from the originating master station. The greater the distance between the master and remote stations, the lower the horizontal obstruction must be to allow both the master and the remote stations to see the meteor trail. The present meteor burst communication system takes into account the technical characteristics and statistical nature of meteor burst phenomena. These characteristics include time intervals between successive meteor burst reflections and the effect of diurnal and seasonal variations. Other characteristics are the density and length of the meteor trails and the effect thereof on radio transmission, such as side angle reflections which often tend to create "hot spots" outside of a normal antenna pattern.

Figure 3:
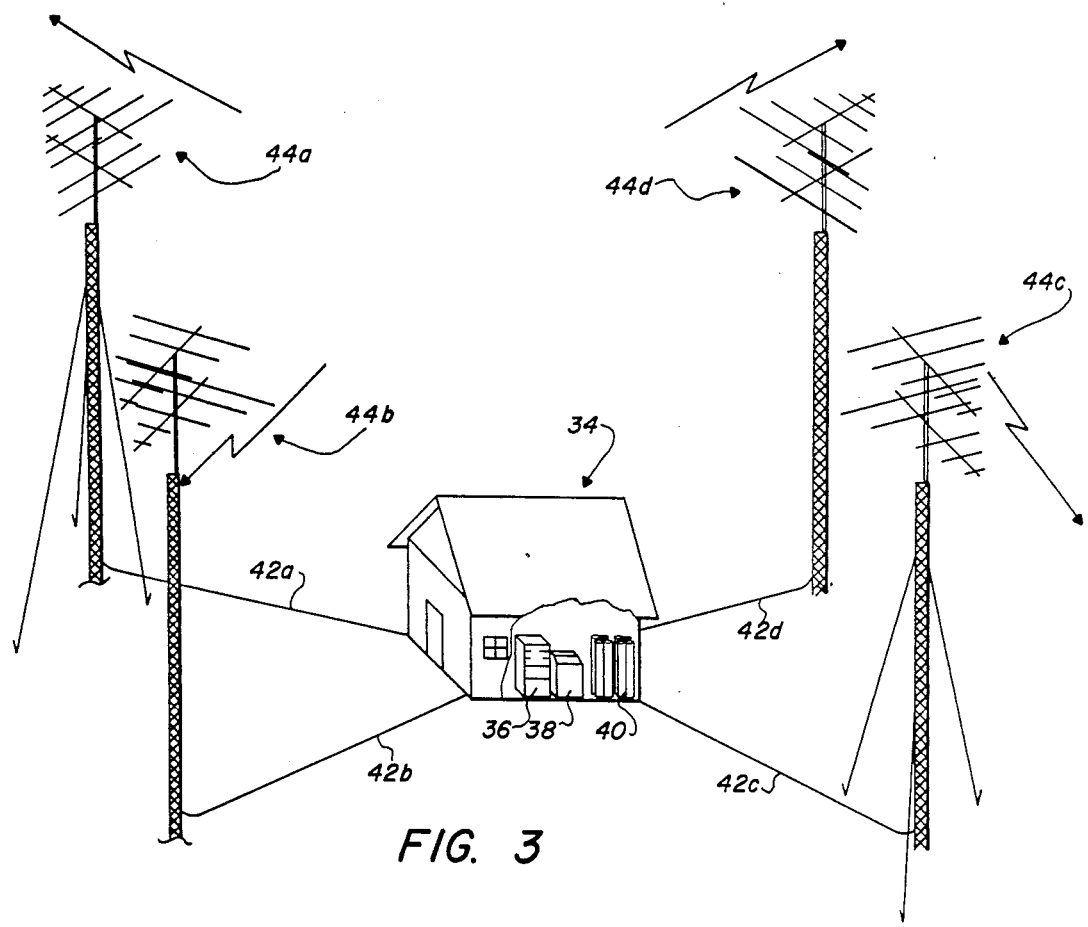
FIG. 3 is a pictorial diagram of a representative master station installation.

FIG. 3 illustrates a typical master station installation. The present system is generally enclosed within a shelter 34 to provide protection from the elements. The basic components of the system within the shelter 34 comprise a housing 36 which includes a transceiver, a control panel, a digital minicomputer, and power supplies. A second housing 38 includes an additional power amplifier with associated controls and meters. A set of duplex filters 40 comprise two free standing 2×2×7' duplex filters in addition to two wall-mounted helical resonators.

Four coaxial cables 42a–d interconnect the transceiver of the system with four directional antennas 44a–d. Although it will be understood that various types of antennas may be utilized, in the preferred embodiment four dual beam five element directional Yagi antennas are horizontally polarized at each master station. Each antenna is 15 dB forward gain and is mounted atop an 80 foot high guide tower and the towers are spaced from the shelter 34 at the corners of a square having sides approximately 40 feet long.

The output of transceiver exciter at each master station is amplified to 2,000 watts at 40.53 MHz by the final power amplifier which comprises a modified Henry radio 4K ultra linear amplifier. The duplexer cavities and helical resonators 40 allow simultaneous operation of the master station transmitter and receivers each with separate frequencies utilizing the same for antennas 44a–d. In this manner, data may be simultaneously received and buffered from a plurality of different remote stations.

Figure 4:
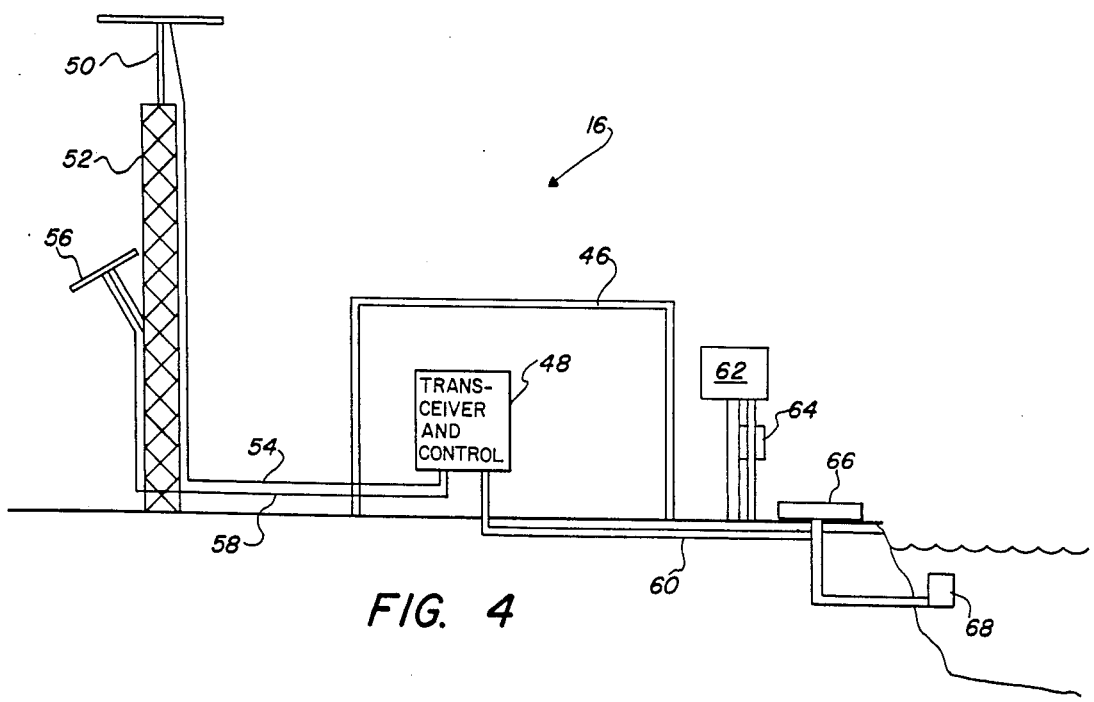
FIG. 4 is a pictorial diagram of a representative remote station installation.

FIG. 4 illustrates a typical remote station generally identified by numeral 16. Each station includes a shelter enclosure 46 for protection against the elements, because many of the remote stations will be located at high elevations which are subject to severe weather conditions. A transceiver and control circuitry 48 are located within a wall mounted weather proofed enclosure. A folded dipole antenna 50 is attached to a tower 52 and is connected to the transceiver and control 48 via a coaxial cable 54. A solar panel 56 is oriented to receive the sun and is connected to provide power to the transceiver and control 48 via wires 58.

Each of the remote stations operate to collect data from several sensors. In the preferred embodiment, the remote stations are connected via cable conduits 60 to a precipitator sensor 62, a temperature sensor 64, a snow pillow sensor 66, and a river level sensor 68, each of which transmits analog data to the remote station storage. The transceiver and control 48 periodically updates the data stored in response to the sensors 62–68 and then transmits the stored data to the master station when pooled.

The receiver of the transceiver 48 is a fixed frequency crystal controlled phase shift key (PSK) receiver tuned to the master station transmit frequency of 40.53 MHz. Transceiver also includes a phase demodulator which is a wideband phase-locked loop for detecting +30 degree PSK master station polling. A base band demodulator circuit is used to provide bit synchronization and bit detection of the data obtained from the phase locked loop. The receiver also employs an absolute power detector which is used to detect a certain level of RF power above which the remote station will respond. This insures tht the remote transceiver will only be activated by meteors that are strong enough to assure reliable transmission of the remote data back to the master station.

The transceiver includes a remote exciter comprising a temperature compensated crystal oscillator followed by a ±90 degree phase modulator, in order to insure that the remote station has a frequency stability of better than ±5 ppm over a wide temperature range. The output of the exciter is amplified to a 300 watt level by a final power amplifier. The amplifier is solid state and is operated Class C to obtain maximum efficiency. A transmit/receive switch is mounted on the power amplifier of the circuit and is utilized to allow the use of a single antenna 50 for both receiving and transmitting. The switch is normally in the receive mode. When a master station poll is detected at the remote station, the transmitter is switched to the antenna 50 and the remote data is transmitted back to the master station. At the completion of the transmission, the switch reverts back to the receive location.

The control logic of the circuit 48 operates to provide a number of different functions. For example, the control 48 receives and analyzes all data from the attached sensors. The control 48 establishes words synchronization with the master station by locating the sync field in the polling signal from the master station. The control 48 determines whether data is to be sent from the remote station to the master station, or whether data is being sent from the master station to the remote station. The control 48 determines whether the remote station is being addressed by the polling signal by comparing the address field in the polling signal against the unique digital address code stored at the remote station. The control 48 controls the transmitter, the transmit/receive switch, and the transmission of theta. The control 48 generates, for use in transmission of data, the preamble including a one's field, a sync character and a station address, along with a text data stream for transmission and a cyclic redundancy check character for transmission. The control 48 also maintains four timers including a duty cycle timer which is a one second timer for preventing the remote station from transmitting more than twice in any one second period. In addition, the control 48 controls an acquisition timer used to require polling signal reception, both on an initial poll and on acknowledgments, within a 50 millisecond period. Further, control 48 controls an inhibit timer which times the period from which a remote station is inhibited from replying to normal polling signals after the receipt of an acknowledge command. The control 48 controls an update timer which determines when a data update is requested. The control 48 further holds and stores for transmission up to 255 bits of sensor data which is supplied by an analog-to-digital converter unit in the data acquisition logic also maintained within the transceiver and control housing 48.

The analog-to-digital converter comprises a dual slope, 12-bit analog-to-digital converter which performs data acquisition and conversion functions. The analog-to-digital converter automatically senses the type of analog data generated by the sensors at the remote station. The converter is normally in an off state and is powered up only during a data interrogation cycle to conserve power and increase operating life. The sensor data generated by the sensors 62-68 is applied through the analog-to-digital converter and is inserted into a buffer storage to wait a transmission request from a master station. Additional data bits are updated continuously by a countdown clock circuit, in order to tell the master station the elapsed time since the last sensor update at the time the master received the data.

Remote stations have power requirements of 15 ma at +12 VDC. The storage power source at the remote station 16 includes two batteries which are float charged by the solar panel 56 with an output of either 0.3 or 0.6 amps with temperature compensation. The remote station transmitter is operated at plus 28 VDC and includes three 4.5 twelve volt batteries which are charged from the twelve volt source at regular intervals. The solar panel 56 is constructed on a reinforced fiberglass base and the panels comprise a Solar Power Model E-12-01365-0.6 which is manufactured and sold by Solar Power, Inc.

Figure 5:
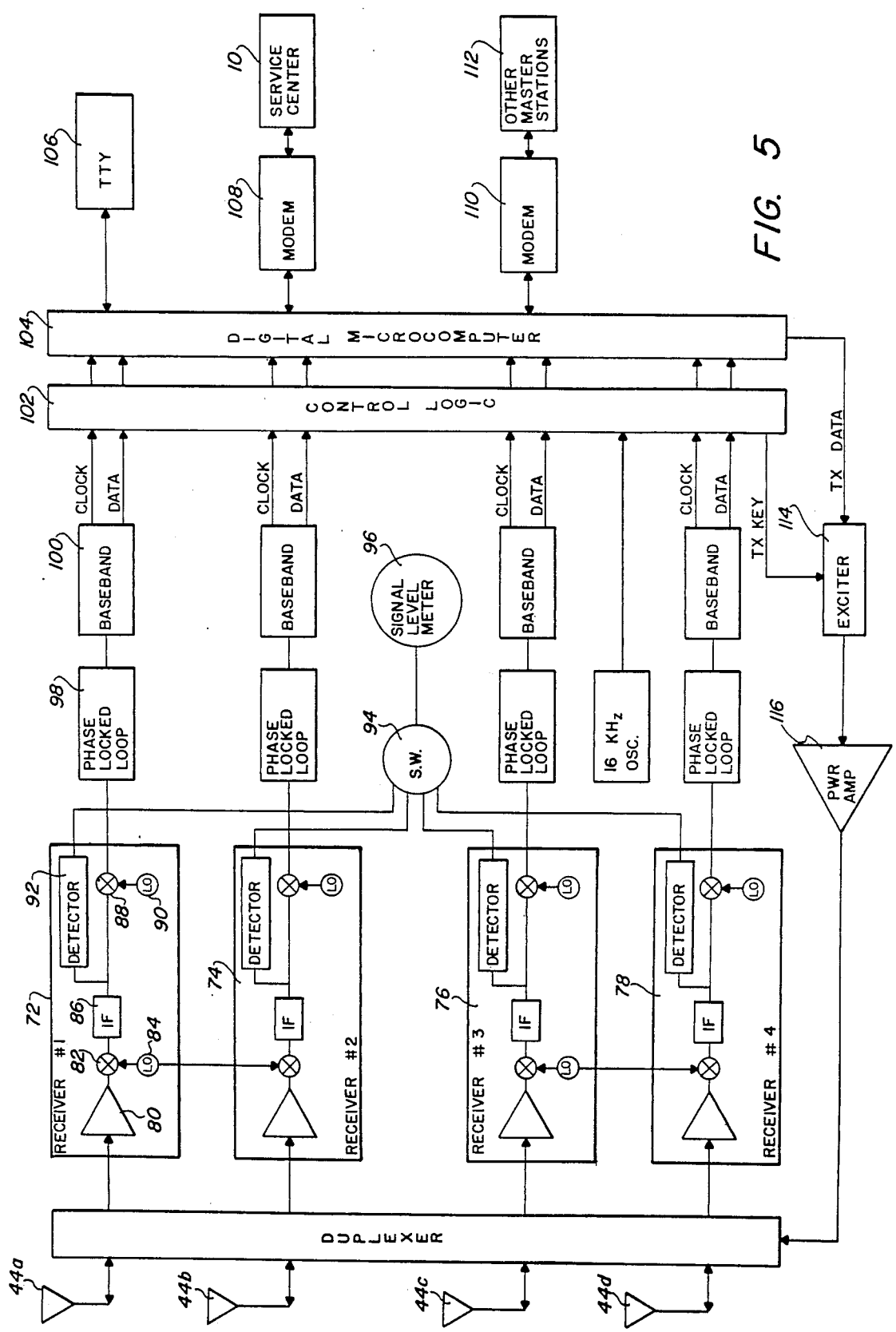
FIG. 5 is a block diagram of the master station hardware.

FIG. 5 is a block diagram of the circuitry of a master station according to the invention. Four antennas 44a-d, previously shown in FIG. 3, are connected to a common duplexer 70. The duplexer is connected to four separate receiver channels 72, 74, 76 and 78. Each of the receiver channels is essentially identical and comprises a fixed frequency PSK receiver tuned to the remote station frequency of 41.53 MHz.

Inasmuch as each of the channels 72-78 are generally identical, only channel 72 will be described in detail. Channel 72 includes RF amplifier 80, the output of which is applied to a converter or mixer 82 which provides mixing from a first local oscillator 84. The mix signal is applied to an IF amplifier 86 which includes a 10.7 MHz narrow band (15 Hz) crystal filter. The outut of the IF amplifier 86 is applied to a second converter or mixer 88 which receives the output of a second local oscillator 90 to obtain a final IF output frequency of MHz. The first local oscillator 84 is used in common between adjacent radio receiver channels 72 and 74.

Each of the radio channels include an amplitude detector 92 connected to the output of the IF amplifier 86 to indicate receiver carrier and noise power. The output of each of the four detectors 92 are connected to a meter driver 94 which drives a signal level meter 96 which is mounted on the front panel of the system. Meter 96 is useful in determining antenna noise levels.

The output of the receiver 72 drives a demodulator circuit which is used to demodulate the ±9.0 degree PSK carrier signal. A narrow band phase lock loop 98 receives the output of the receiver and drives a coherent reference signal from the ±9.0 degree signal. The reference signal is then mixed with the input signal to obtain the baseband signal. At this point of the circuit, the baseband signal comprises the desired digital data, but includes a substantial amount of noise. In order to provide optimum protection performance, a post detect matched filter is generally utilized. A baseband demodulator 100 receives the digital signal and provides bit detection and bit synchronization. The bit detector is preceded by the integrate and dump matched filter described above. The output of the base landing modulator comprises a clock and a data output which are applied to a buffer driver within the control logic 102.

Control logic 102 receives clock and data output from each of the four receiver channels briefly described. The control logic 102 further includes computer interface circuits which provide interfacing to a digital minicomputer 104. In the preferred embodiment, a Nova 3 minicomputer manufactured and sold by Data General Corporation is utilized. The computer 104 includes a microprocessor and 16K words of cold storage, in addition to a real time clock, automatic program load and power monitor/auto restart. The computer interfaces to a local teleprinter 106 and a modem such as an RS-232C modem 108 to provide access to the service center 10. The computer 104 is also connected through a modem 110 in order to provide communication with the other master station or stations 112, as previously noted in FIG. 1.

The control logic 102 and digital computer 104 provide transmit key and transmit data signals to an exciter 114 which comprises a 40.53 MHz crystal oscillator followed by a ±30 degree linear phase modulator. The modulator is utilized to minimize the transmitter side band spectrum and applies the transmission data through a power amplifier 116 to the duplexer 70 for transmission via the antennas 44a-b.

During normal operation, the master station computer 104 automatically controls the operation of the master station. This operation includes turning the transmitter on and off at appropriate times, scheduling and generating polling signals, receiving storing and logging all remote data, and communicating with both the other master station computers and the service center computer 10. The control logic 102 of the system is capable of generating any serial data stream commanded by the computer 104, with the data rate being determined by the crystal controlled clock generated at the master station receiver. Data received by each of the receiver channels is presented to the control logic 102 which enters it into the digital computer 104 bit by bit.

Fully automatic operation of the system is provided by a real-time clock which provides indications of the time of day and elapsed time. The time of each master station may be updated at any time by a teleprinter input or by the service center computer. A power monitor/auto-restart circuit is provided to allow the master station to recover from a power failure. Following a power failure, the computer 104 will automatically report the time of the failure to the service center computer 10 and request an update of the time of day. Since core storage is provided, the software and data is retained indefinitely without required battery backup.

Figure 6:
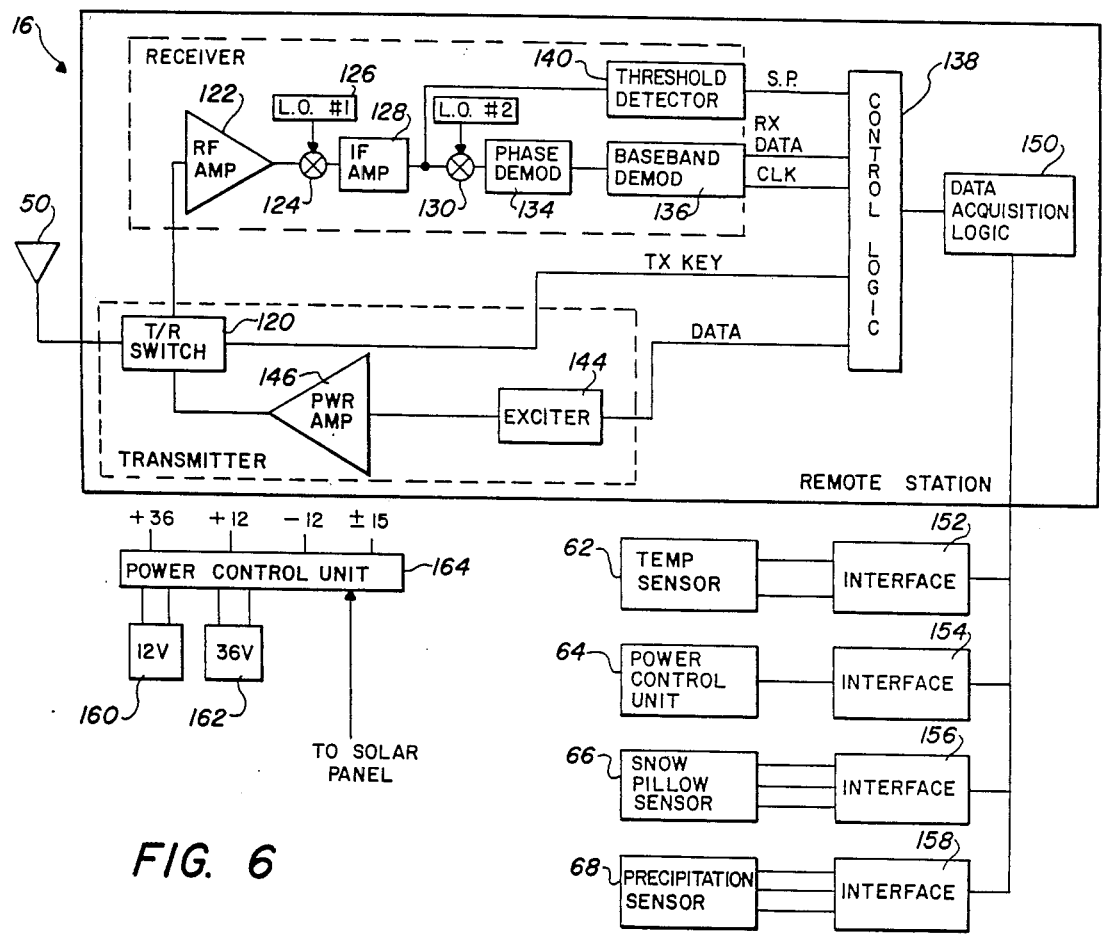
FIG. 6 is a block diagram of remote station hardware.

FIG. 6 is a more detailed block diagram of the circuitry of a remote station generally identified by the numeral 16. As previously noted, each of the remote stations includes a directional antenna 50 which is directed to a T/R switch 120. The receiver portion of the transceiver includes an RF amplifier 122 tuned to the master station transmit frequency of 40.530 MHz. The output of the amplifier 122 is mixed in a mixer 124 with the output of a first local oscillator 126. The converted signal is applied to an IF amplifier 128, the output of which is mixed by a mixer 130 with frequency from a second local oscillator 132. The resulting signal is applied to a phase demodulator 134 which comprises a wide band phase-locked loop used to detect ±30 degrees PSK master station polling signals.

The output of demodulator 134 is applied to a baseband demodulator 136 which is utilized to provide bit synchronization and bit detection of the data obtained from the phase locked loop. The output of the demodulator comprises a receiver data and clock signals which are applied to the control logic 138 for processing. An absolute power detector 140 detects the output of the IF amplifier 128 in order to detect a certain level of RF power above which the remote unit will respond. The detected signal by the detector 140 is applied to the control logic 138 to insure that the remote transmitter is activated only by meteors that are strong enough to assure reliable transmission of the data back to the master station.

Transmit key signals are applied from the control logic 138 to the T/R switch 120 to control the operation of the transceiver. Data from the control logic 138 is applied to an exciter 144 which comprises a temperature compensated crystal oscillator followed by a ±90 degrees phase modulator to provide the desired frequency stability of the system. The output of the exciter 144 is amplified by power amplifier 146 which comprises a 300 watt level amplifier operated class C for maximum efficiency. The output of the power amplifier is connected through the T/R switch 120 to the antenna 50.

The control logic comprises a plurality of integrated circuits of the CMOS logic family. The control logic receives the output of an analog-to-digital converter in data acquisition logic 150 which is connected through interfaces 152, 154, 156 and 158 to receive the outputs of the sensors 62, 64, 66 and 68 described with respect to FIG. 4. The analog-to-digital converter comprises a dual slope, twelve bit converter to perform the data acquisition and conversion function by applying the sensed data in digital form to the control logic for transmission to the master station. The converter is normally in the off state, but is powered up during a data interrogation cycle to conserve power and increase operating life. When the control logic 138 commands an update of data stored in its buffers, the sensor data is inserted from the A/D converter into the buffer storage in the control logic 138 in order to await a transmission request.

As previously noted, power is provided to the remote stations from a twelve bolt storage battery 160 and a 36 volt storage battery 162 which is connected to a power control unit 164. In addition, electrical energy from the solar panel 56 shown in FIG. 4 is also applied to the power control unit 164. The power control unit thus provides a range of plus and/or minus operating voltages for the power mode station.

Figure 7:
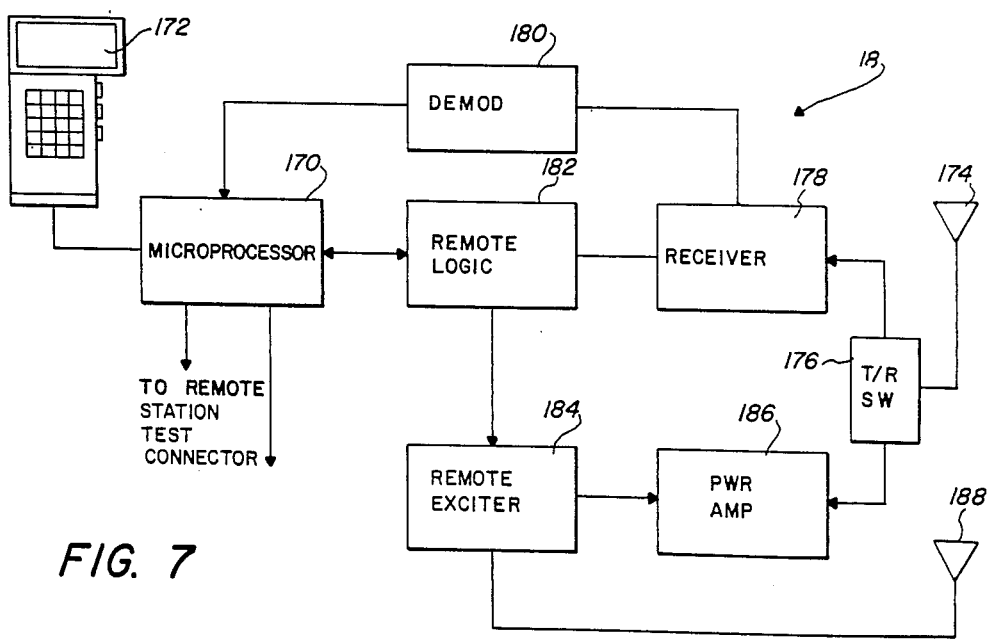
FIG. 7 is a block diagram of a portable communication and field test unit.

As previously noted in FIG. 1, the present invention contemplates the use of one or more portable field test units 18. A block diagram of a typical portable field test unit 18 is shown in FIG. 7. The heart of the unit 18 comprises a digital microprocessor 170 which enables diagnostic tests to be run on the remote station circuitry. The microprocessor thus contains connectors which may be interconnected with the remote station circuitry to provide diagnostic testing thereof. A hand held terminal 172 may comprise, for example, a Termiflex HT/2 hand held alphanumeric terminal which enables the operator to compose and display alphanumeric messages for transmission to the master and to display alphanumeric messages received from the master station. The display of the terminal 172 may display twenty characters simultaneously, while up to 1,000 characters may be stored in the circuitry for displaying at operator requests.

The portable field test unit 18 may be connected directly to the remote station test connector and a message can therefore be loaded into the remote station buffers for transmission to the master station and display of the message on the hand held terminal 172 is provided. The data from the various sensors 62–68 may be interrogated in this manner and displayed on the hand held terminal 172.

The circuitry of the portable field test unit 18 further includes an antenna 174 which is connected to a T/R switch 176. The switch is connected to a receiver 178 which applies received statements through AD modulator 180 which stores the data within the microprocessor 170. Remote logic 182 is connected between the microprocessor 170 and the receiver 178 and applies the transmission signals through an exciter 184 and a power amplifier 186 and through the switch 176 to be transmitted via the antenna 174. An optional test set antenna 188 may be connected to the remote exciter in order to interrogate and receive at close range any closely adjacent remote station. The data transmitted by the remote exciter 184 is processed by the remote logic 182 and may also be displayed on the hand held terminal 172 for verification.

MASTER STATION CONTROL LOGIC

Figure 8:
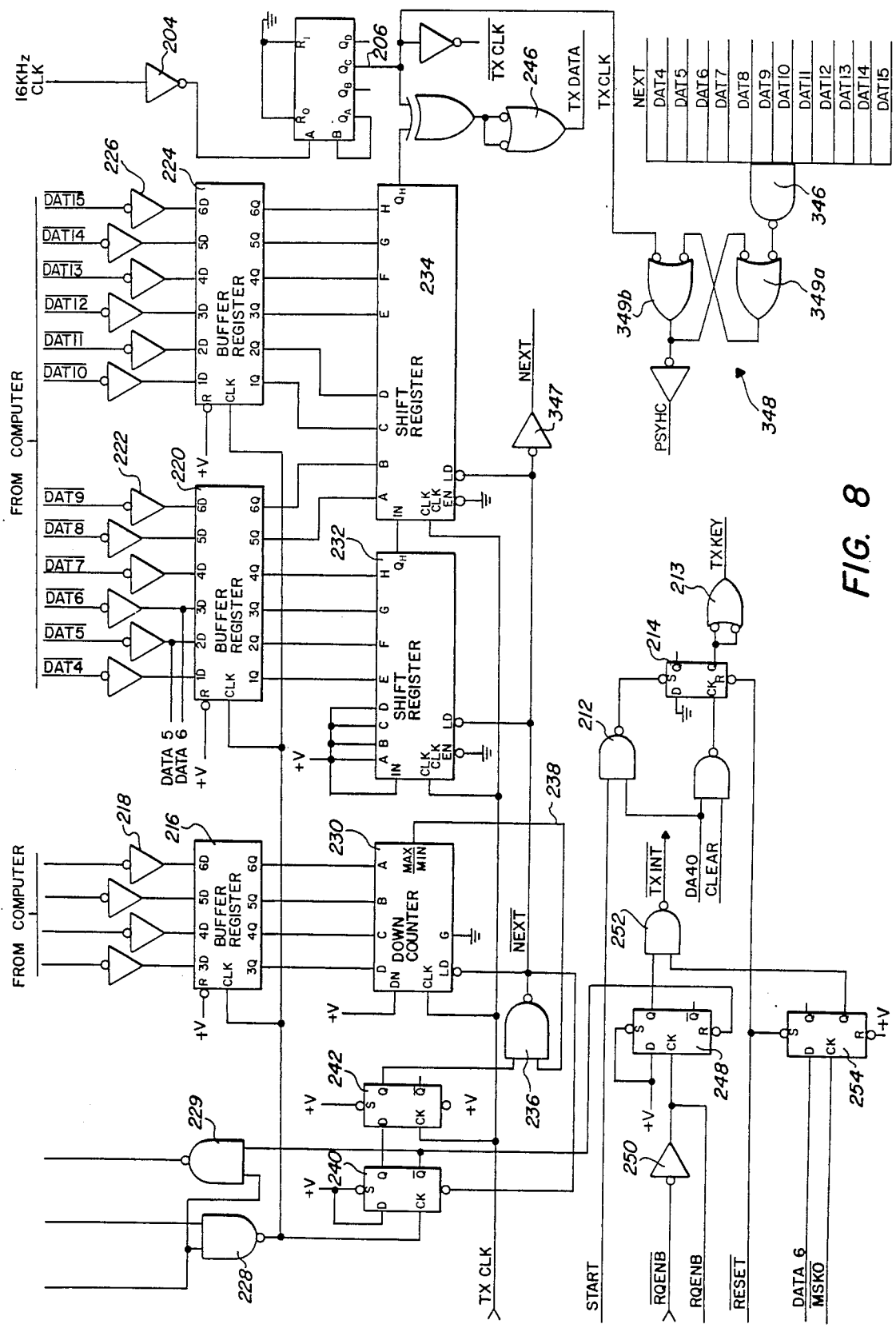
FIGS. 8-10 are schematic diagrams of circuitry for the master station control logic portion of the block diagram shown in FIG. 5.
Figure 9:
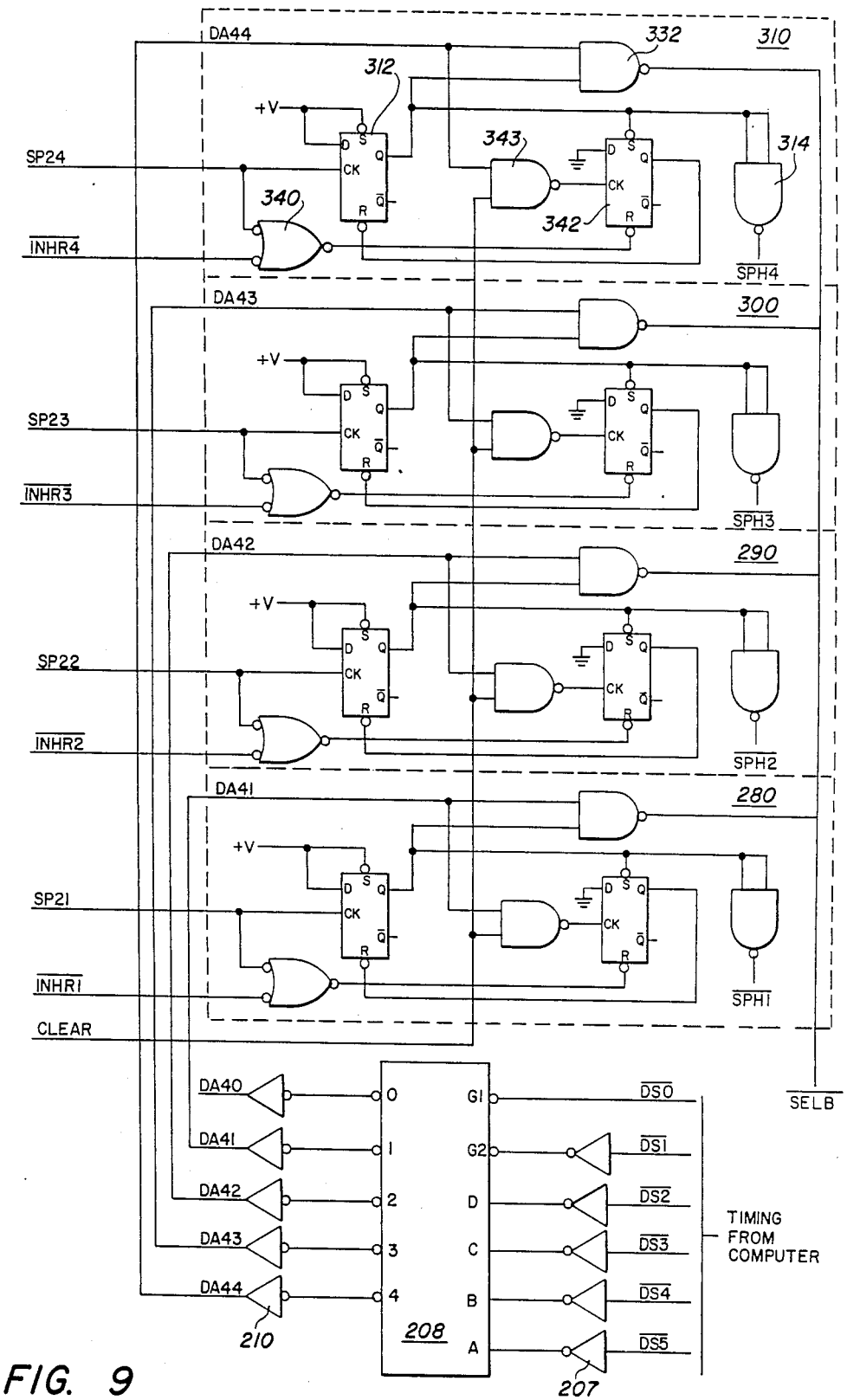
Figure 10:
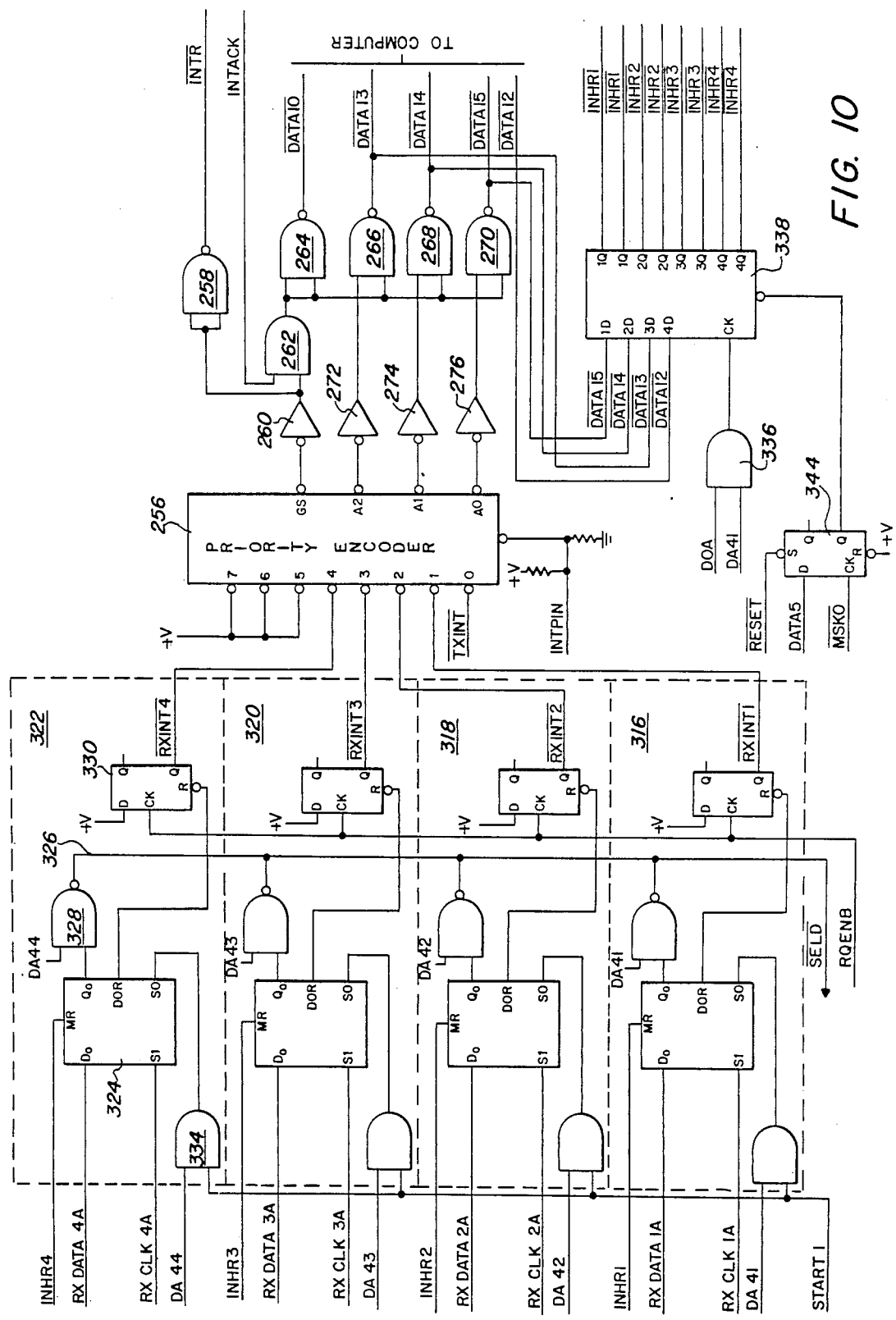

Turning now to FIGS. 8–10, specific circuitry for implementing master station control logic 102 to provide interfacing between minicomputer 104 and the transceiver portion of the master station hardware is presented in schematic diagram form. In general, the master station control logic accepts commands and data from the minicomputer for controlling the transmitter portion of the master station transceiver and for generating the transmit data stream, referred to as the probe. In addition, the master station control logic accepts data from the master station receivers and transfers the information to the computer for analysis and processing.

Timing for the master station control logic is derived from both the transceiver and the computer. A crystal derived 16-kHz clock is provided by the receiver portion of the transceiver, as shown in FIG. 5, and is applied to a divide-by-eight counter 202 through an inverter 204 as shown in FIG. 8. The output of the counter available on output line 206 is a 2-kHz clock signal designated TXCLK.

Referring briefly to FIG. 9, timing signals utilized in the master station control logic are further derived from the computer and received over six input lines designated DS0 through DS5. The binary code present on these input lines is applied through inverters 207 to a decoder circuit 208 which decodes the binary-coded input address into one of five mutually exclusive outputs. More particularly, the output signals available from decoder 208 are designated DA40, DA41, DA42, DA43, and DA44. The output signals obtained from decoder 208 are inverted by a group of inverters 210 to provide the complement of each signal. Decoder 208 receives an address code from the computer and provides a single enabling output corresponding to the selection of control logic for either the transmitter or one of the four receivers.

The master station control logic under computer command controls the transmitter power by gating transmitter exciter 114 On and Off. The transmitter exciter is turned On when the computer executes an instruction and provides an address on the address bus that is decoded by decoder 208 as requesting the signal DA40. This signal is gated by the computer I/O start pulse, START, at NAND gate 212 in FIG. 8 to set flip-flop 214 and initiate the signal TXKEY through gate 213 which goes to exciter 114. In a similar manner, the transmitter is turned off by a computer instruction with results in a resetting of flip-flop 214.

With reference again to FIG. 8, the portion of the master station control logic which relates to the generation of a data stream (i.e., probe generation) under computer control for transmission at the data rate of TXCLK is presented.

The computer controls probe generation by outputting data words in a 15-bit format comprising a 4-bit count field, a parity bit, and a 10-bit address. The first four binary bits are the count field, and the last twelve binary bits are data. The computer outputs data words with a data out instruction, designated DOA. The probe data is supplied to the master station control logic over the lines designated DAT0 through DAT15. The four bits of the count field are strobed into a 4-bit buffer regiater 216 after inversion by inverters 218. The next twelve bits of probe data are strobed into buffer registers 220 and 224 after inversion by inverter groups 222 and 226, respectively. The data word output from the computer is strobed into buffer registers 216, 220 and 224 by a signal from AND gate 228. The strobe signal is initiated by the existence of the DOA instruction from the computer along with a coded instruction from the computer that is decoded by decodeer 208 as a selection of the transmitter. Decoder 208 provides the signal which is applied as an input to AND gate 228 along with DOA. AND gate 229 provides an indication on the $\overline{SELD}$ bus to the computer that the transmitter has been selected, but a data out instruction has not been sent.

The four count bits are transferred to means, such as down counter 230, for holding a count of the total number of data bits in the probe and providing an indication that the last data bit has been provided to the transmitter. The twelve data bits are transferred into means for holding probe data bits from the computer and providing a serial bit stream to the transmitter. In the embodiment shown, such means comprises 8-bit parallel in/-serial out shift registers 232, 234. Transfer of the probe data stream to be transmitted is under the direction of a load signal designated $\overline{NEXT}$ applied to counter 230 and shift registers 232, 234 from NAND gate 236. The signal $\overline{NEXT}$ occurs upon the completion of a previously transmitted data word, as will be hereinafter more completely described.

The signal TXCLK from counter 202 is utilized to shift each bit out of the shift registers. TXCLK counts down counter 230 toward zero as each bit is shifted out of shift registers 232, 234. When counter 230 reaches count zero, indicating that the last bit has been shifted out, a signal is initiated from counter 230 over line 238, which signal is applied as an input to NAND gate 236 to remove the enabling signal $\overline{NEXT}$.

If another data word has been loaded into buffer registers 216, 220 and 224, flip-flop 240 will be set by a clock signal from AND gate 228 initiated by a DOA instruction from the computer. Also, flip-flop 242 will be set in response to the setting of flip-flop 240 and NAND gate 236 will generate $\overline{NEXT}$, permitting the next word to be transferred into counter 230 and shift registers 232, 234. Flip-flop 240 is and reset by the occurrence of the signal $\overline{NEXT}$. Accordingly, the Q output of flip-flop 240 is in a logic "1" or "true" condition whenever there is a data word in the buffer register. Flip-flop 242 synchronizes loading of the shift registers with TXCLK in order that a new computer word cannot be loaded into the shift registers in the middle of a bit shifting time period.

The Manchester TXDATA signal for the exciter in the transceiver is generated by the combining of the output of shift register 234 and TXCLK in Exclusive-OR gate 244. The combining of the serial data from shift registers 232, 234 with TXCLK in Exclusive-OR gate 244 results in NRZ coded data for transmission. The signal available from exclusive-OR gate 244 is inverted by gate 246.

The computer generates a probe word in response to a transmit interrupt request generated by the control logic circuitry. The request enable signal, $\overline{RQENB}$, continuously clocks flip-flop 248 via inverter 250. When the input buffer registers 216, 220 and 224 are empty, the $\overline{Q}$ output of flip-flop 240 goes to a logic "1" in response to resetting by the $\overline{NEXT}$ signal, releasing the reset input of flip-flop 248 and allowing RQENB to set the Q output of flip-flop 248 to a logic "1". The signal available from the Q output of flip-flop 248 is applied to one input of NAND gate 252. The other input of NAND gate 252 receives a signal from the $\overline{Q}$ output of flip-flop 254. The signal from flip-flop 254 is an enabling input to NAND gate 252 which occurs upon the existence of a logic "1" on the DATA 6 line simultaneous with a positive-going transition of the signal $\overline{MSKO}$ from the computer. If the transmit interrupt is enabled, the setting of flip-flop 248 will result in the initiation of a $\overline{TXINT}$ signal reflected by the output of NAND gate 252 going to a logic "0" condition.

The transmit interrupt signal $\overline{TXINT}$ is applied to priority encoder 256 in FIG. 10 resulting in the generation of an interrupt request signal $\overline{INTR}$ from encoder 256. The interrupt request signal $\overline{INTR}$ is available from gate 258 following inversion by inverter 260. The signal TXINT has the lowest priority of the signals applied to priority encoder 256. Accordingly, a transmit interrupt request will not be generated until all other requests have been serviced. That is, in addition to the existence of a logic "0" condition for the TXINT signal, a second condition for the generation of the interrupt request INTR is that the interrupt chain through the priority encoder must not be overridden by other input/output devices with higher priority. Such second condition is indicated by the signal INTPIN applied to priority encoder 256 which must be a logic "0".

Upon the generation of the transmit interrupt request INTR, the computer responds with a signal INTACK. This signal is applied to one input of AND gate 262 in the schematics shown in FIG. 10. The second input to AND gate 262 is the signal INTR. The output of AND gate 262 enables NAND gates 264, 266, 268 and 270 to present at their outputs an interrupt code established in accordance with the binary coded bits available from priority encoder 256 via inverters 272, 274 and 276. The interrupt code represented by the four binary bits designated DATA 10, 13, 14 and 15 identifies the interrupt source to the computer as being the transmit interrupt, whereupon the computer responds by outputting the next probe data word, setting flip-flop 240, and resetting flip-flop 248 which removes the interrupt request.

As the master station receiver contains four receivers, each of which constitutes an independent data channel, the data reception portion of the master station control logic must accept data from a number of channels and route it to the computer. Since the received data arrives in random fashion, any or all of the channels may be active at any particular time. As soon as a received signal is detected, the receiver generates a signal presence indication designated SP. The receiver continues to receive data until the first "0" in the data bit stream is detected. Following the detection of the first "0" in the data bit stream, the receiver generates a signal designated SP2 and turns on a 2-kHz clock signal designated RXCLK. The signal SP2 from each receiver is supplied to the master station control logic. Since there are four receiver channels, the receiver logic is repeated four times. Signals in the control logic schematic of FIG. 9 are subscripted with an identifying number corresponding to a particular receiver number.

With reference now to FIG. 9, receiver logic circuits which receive the signals SP2 from the receivers and generate signal presence hold, designated SPH, are shown. The SPH signals generated by the logic are used to force the receiver to continue to present data and clock signals to the computer, regardless of the existence of a signal presence indication within the receiver. More particularly, identical logic circuits 280, 290, 300 and 310 are shown. Since the circuits are identical in configuration and operation, only logic circuit 310 operable in connection with receiver channel number 4 will be described in detail.

The signal SP24, denoting the signal SP2 for receiver channel 4, starts the sequence of operation for logic circuit 310 by setting flip-flop 312. The Q output of flip-flop 312 is applied to a NAND gate 314 connected as an inverter to provide a signal SPH4 to hold the receiver in the receive mode.

Referring briefly to FIG. 9, additional circuitry in the receive logic for receiving and routing data from the receivers is shown. Again, the circuitry shown consists of four identical logic circuits 316, 318, 320 and 322. Each of these logic circuits receives the 2-kHz RXCLK signal generated by the receiver whose data the logic circuit routes.

With reference to logic circuit 322 for receiver channel number 4, with each low-to-high transition of RXCLK4, a new bit of data is clocked into the first-in, first-out (FIFO) register 324 as the bit is received. The data bits are rippled through the FIFO to the output thereof and are applied to a data bus 326 through NAND gate 328. Data bus 326 is common to all of the logic circuits 316, 318, 320 and 322. Data bus 326 makes available the received data to the computer for processing. Once data is available on bus 326, FIFO 324 initiates a signal releasing the reset input of flip-flop 330, thereby allowing the first interrupt request enable signal RQENB supplied from the computer to the clock input of flip-flop 330 to initiate a receiver interrupt signal RXINT on the Q output.

A separate interrupt signal is generated by each of the logic circuits. The receiver interrupt signal from each of the logic circuits 316, 318, 320 and 322 are applied to priority encoder 256. Generation of the interrupt signal INTR and the interrupt code available over the lines designated DATA 10, 13, 14 and 15 is identical to the generation of the transmit interrupt previously discussed.

Upon recognizing an interrupt code, the computer responds by outputting an instruction resulting in the generating of a signal DA44, DA43, DA42, or DA41, depending upon which receive channel requested in the interrupt from decoder 208 in FIG. 9. Therefore, as receiver 4 is under consideration in this discussion and data is presumed to be contained on receiver channel 4, the computer checks the output of NAND gate 332 in logic circuit 310 shown in FIG. 9 by applying a signal DA44 to one input thereof, with the Q output of flip-flop 312 supplying the signal to the other input. In this manner, the computer determines whether the signal SP24 has set flip-flop 312. If the output signal from NAND gate 332 (i.e., SELB) is a logic "0", the computer accepts the data bit on SELD bus 326 as supplied by NAND gate 328 in FIG. 10. The signal DA44 is also applied to NAND gate 328 and ensures that the channel 4 data is on the data bus 326.

After ascertaining that the channel 4 data is on the SELD bus 326, the computer generates a start pulse which is applied as an input to AND gate 334 along with the signal DA44. The signal generated at the output of AND gate 334 clocks the next data bit to the output of FIFO 324. The DOR output of FIFO 324 is caused to go to a logic "0" momentarily and resets the interrupt flip-flop 330. The process repeats itself until all data bits have been input to the computer.

After the computer has determined that the proper number of data bits have been received, the computer generates a DA41 signal and a DOA signal which are applied to AND gate 336. The output of AND gate 336 is applied to quad flip-flop 338 to store a code generated by the computer and placed on the computer output bus lines DATA 12, 13, 14 and 15. The code generates a signal INHR which is used to reset a particular FIFO. In the case of the discussion of that portion of the circuitry relating to the channel 4 FIFO 324, the code will generate a signal INHR4. This signal is applied to negative-two-input NOR gate 340 in FIG. 9 to release the signal presence hold signal SPH4 by resetting flip-flop 342, which in turn resets flip-flop 312. Flip-flop 342 is initially reset by a clock pulse from NAND gate 343 in accordance with the application of DA44 and CLEAR as inputs thereto.

While INHR is high, the receive logic for a corresponding particular receiver channel is inhibited from receiving. All receivers can be inhibited simultaneously by a clock pulse $\overline{\text{MSKO}}$ applied to flip-flop 344 after the D-input to the flip-flop has been set to a logic "1". The existence of such conditions causes the $\overline{Q}$ output of flip-flop 344 to reset all of the flip-flops in device 338 and present a logic "0" on each Q output.

As will be noted, address decoding for selecting the desired receiver channel or transmitter is performed by decoder 208 shown in FIG. 9. The four receivers and the transmitter have been assigned priorities wherein receiver 4 has the highest priority, receiver 3 has second priority, receiver 2 has third priority, receiver 1 has fourth priority, and the transmitter has the lowest priority.

A probe SYNC pulse is generated under software control. NAND gate 346 decodes on all ONES probe word output from the computer. The NEXT pulse from inverter 347 synchronizes the decode with the probe generation, and latch 348 extends the pulse to 250 microseconds. Latch 348 comprises negative input OR gates 349a and 349b, and receives TXCLK as an input. The PSYNC signal is supplied back to the computer.

REMOTE STATION CONTROL LOGIC

With reference now to FIGS. 11-15 the remote station control logic for generating all timing and control functions necessary to receive and analyze master station probes, including address recognition, and to transmit a reply is shown in schematic diagram form.

Figure 11:
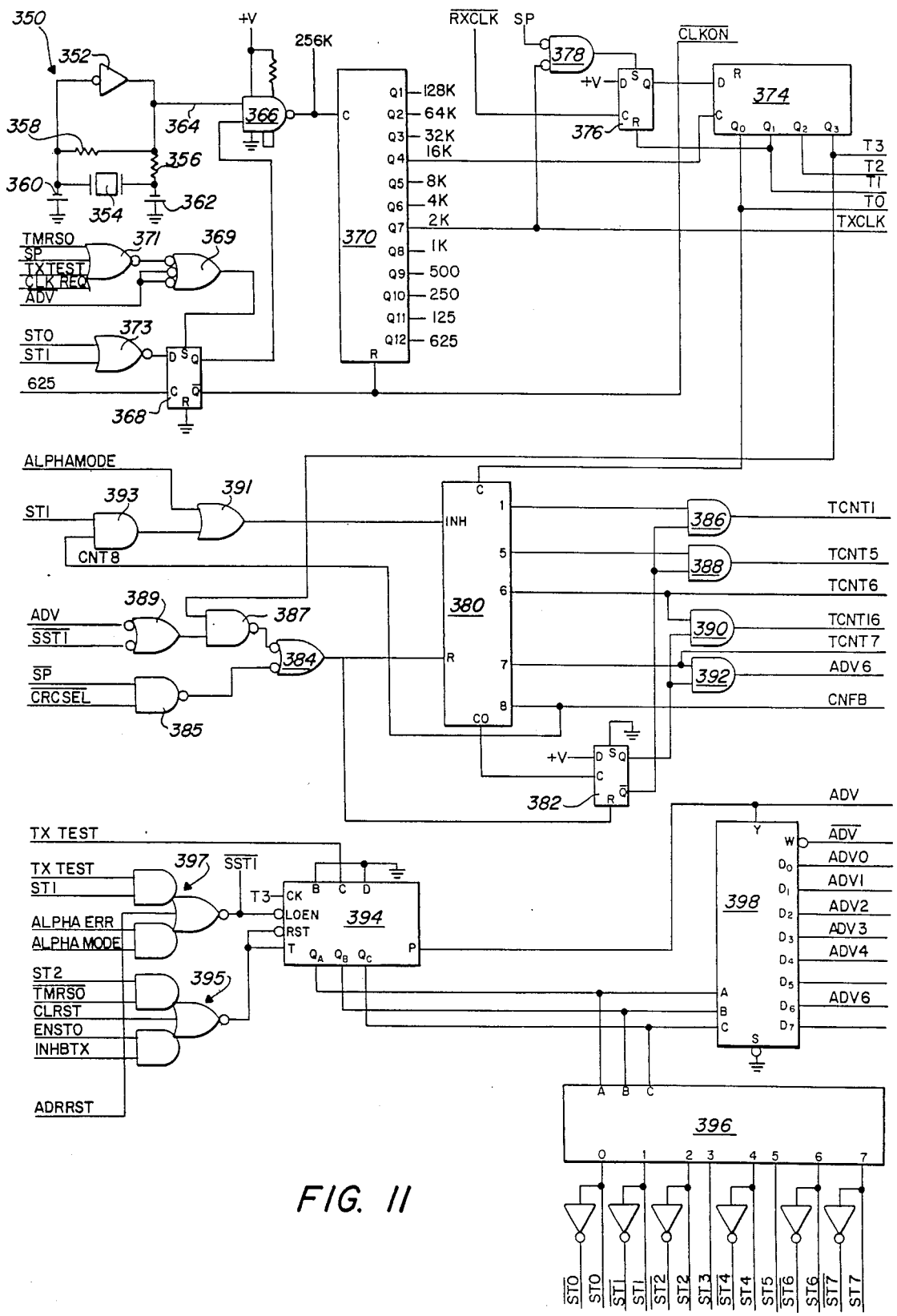
FIGS. 11-15 are schematic diagrams of circuitry for the remote station control logic portion of the block diagram shown in FIG. 6.

Remove station control logic timing is generated by the logic shown in FIG. 11. A two stage oscillator 350 provides a source of internal timing signals for the control logic. Oscillator 350 includes an inverter 352 having a feedback network between the input and output comprising a 256 kHz crystal 354. A resistor 356 is in series with crystal 354, and this combination is in parallel with resistor 358. In addition, the feedback network comprises shunt capacitors 360 and 362, each capacitor being connected between ground and one side of crystal 354.

The first oscillator stage runs continuously and supplies a clock signal over line 354 to a second stage comprising NAND gate 366. The second stage functions to gate "on" the 256 kHz clock with the CLKON signal generated at the Q output of flip-flop 368. When CLKON is a logic "1", the 256 kHz signal is applied to the clock of 12-bit binary counter 370.

Flip-flop 368 is set to provide a CLKON signal by a logic "1" from OR gate 369 whenever required by the conditions present at its inputs. Signals input to OR gate 369 include $\overline{\text{ADV}}$ from the state control portion of the logic and a signal from NOR gate 371, which itself receives the input signals SP, TXTEST, CLK and TMR50. Flip-flop 368 is clocked by the 62.5 Hz signal from counter 370. The D input is established by the output of NOR gate 373 which provides a logic "0" if the control logic is in either a delay state or an idle state. Accordingly, CLKON and the 256 kHz clock stay on following setting of flip-flop 368 in the described manner until the control logic returns to State 0 or State 1 and counter 370 completes a cycle.

Clock signals ranging from the 256 kHz frequency to 62.5 Hz are made available from counter 370. A 16 kHz clock available from counter 370 over output line 372 is applied to the clock input of a 4-bit shift register 374. Single bit serial data is input to shift register 374 from the Q output of flip-flop 376. A signal RXCLK from the remote station receiver is applied to the clock input of flip-flop 376 and the D input is tied to a logic "1". A negative input AND gate 378 supplies a signal to the Set input of flip-flop 376, which gate receives as inputs a 2 kHz clock signal from counter 370 and a signal presence level SP from the receiver. The Reset input of flip-flop 376 receives a signal from the $Q_1$ output of shift register 374.

Shift register 374 and flip-flop 376 in combination provide for the generation of four, phased timing pulses synchronized with each bit received during transmission. These four timing pulses are available as T0, T1, T2 and T3. These timing pulses are used to sequence processing of received data.

A 5-stage Johnson decade counter 380 with a built-in code converter provides a count of the number of bits processed in each data field during reception or character check transmission. Counter 380 receives as a clock input signal T0 from shift register 374. A carryout signal from counter 380 is applied to the clock input of flip-flop 382. Ten decoded outputs are available from counter 380. These outputs are normally low and go high only at an appropriate decimal time period. AND gates 386 and 388 receive as logic inputs the signal available on the $\overline{Q}$ output of flip-flop 382. In addition, AND gate 386 receives the count number "2" output from counter 380. AND gate 388 receives the decoded count number "5" output from counter 380. These two gates provide the TCNT1 signal and the TCNT5 output respectively. The TCNT16 signal is derived from AND gate 390 which receives as input a signal from the Q output of flip-flop 382 and the decoded count number "6" output from counter 380. A signal ADV6 is derived from AND gate 392 which receives as logic inputs the signal from the Q output of flip-flop 382 and the decoded count number "7" from counter 380.

Counter 380 and flip-flop 382 are simultaneously reset by a signal from OR gate 384. Resetting occurs upon the existence of the designated input conditions on NAND gate 385, or upon the existence of the conditions indicated for the combination logic comprising NAND gate 387 and OR gate 389. Operation of counter 380 can also be inhibited by a signal to the INH input from OR gate 391. An inhibit signal is issued upon the occurrence of ALPHAMODE, or upon the existence of a state 1 condition for the control logic and a count of eight in counter 380 as detected by AND gate 393.

The timing and field bit count logic is operative in accordance with a particular control state of the remote station control logic. The remote station control logic has eight control states ST0 through ST7. The logic circuitry for defining the current state of the remote station centers around synchronous 4-bit counter 394 shown in FIG. 11 which always contains a count from 0 to 7 corresponding to the current control state. Counter 394 is clocked by timing pulse T3 from shift register 374 and provides a BCD output indicative of the current state of the control logic. The three most significant bits of the BCD output from counter 394 are applied to a BCD-to-decimal decoder 396 and to a data selector 398. Decoder 396 codes the count in counter 394 and provides one-of-eight discrete logic levels indicative of the current state of the control logic. Data selector 398 selects one-of-seven signals ADV0 through ADV6 for advancing the control logic from one state to the next.

The advance signal ADV is supplied as a count enable input P to counter 394. Count enable input T for counter 394 is supplied by AND/OR logic 395. Both count-enable inputs T and D must be logic "1's" for counter 394 to count. Counter 394 is presettable to the logic levels setup at the counter inputs A, B, C and D. As presetting is synchronous, AND/OR logic 397 sets up a logic "0" level at the load input LD, and the next clock pulse sets the Q outputs to agree with the setup inputs.

State 0 of the control logic, designated ST0, is a duty cycle time delay state during which received signals are ignored. State 0 is used to control the transmitter duty cycle and prevent continuous reception of signals during high noise or interference conditions.

Figure 12:
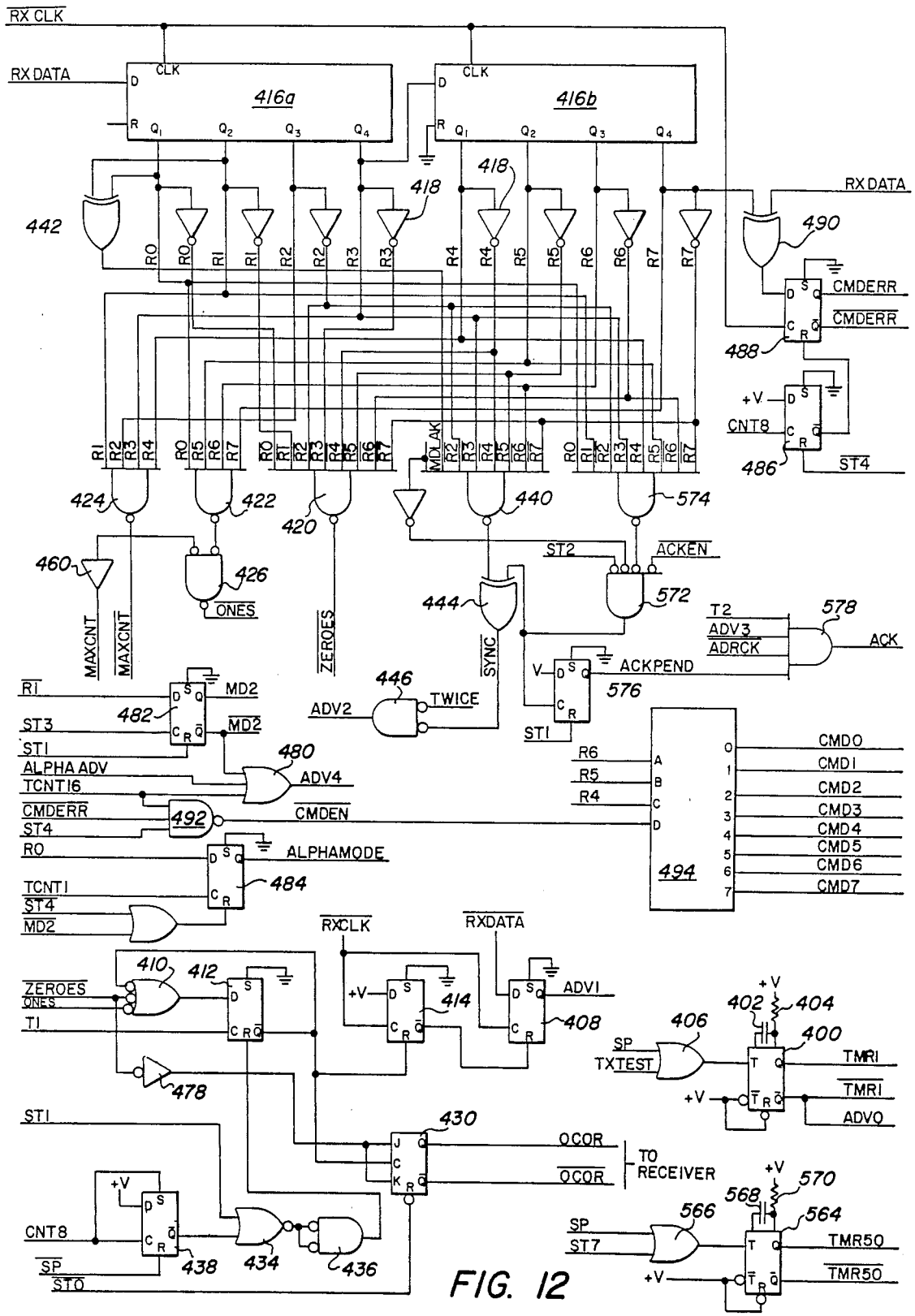

With reference to FIG. 12, a circuit for controlling the delay is one-shot multivibrator 400 having external timing components capacitor 402 and resistor 404. Multivibrator 400 is triggered by a signal from OR gate 406 which receives as an input a signal present SP and a transmitter test signal TXTEST. A signal ADV0 is available from the $\overline{Q}$ output the multivibrator 400, which is passed through data selector 398 to counter 394 to enable counter 394 to advance from State 0 to State 1. The delay provided by multivibrator 400 is for approximately one second following transmission or an unsuccessful attempted signal acquisition.

State 1 indicated by the signal ST1 is the normal idle state for the remote station control logic. To advance from State 1, a signal present indication SP by going to a logic "1" and nine ONES in the probe must be detected as will be more fully described hereinafter. The logic circuitry for generating an ADV1 signal to advance the control logic from State 1 is shown in FIG. 12, with the ADV1 signal being available from the Q output of flip-flop 408. Received data designated RXDATA is applied to the D input of flip-flop 408 with PXCLK being applied to the clock input.

Signals reflecting the presence of eight consecutive ONES or ZEROES are applied to negative input OR gate 410. An indication that either all zeroes or all ones have been received will provide a logic "1" output from OR gate 410 which is applied to the D input of flip-flop 412. Timing pulse T1 from shift register 374 in FIG. 11 clocks flip-flop 412 to store the output of OR gate 410. The $\overline{Q}$ output of flip-flop 412 is fed back as an input to OR gate 410 to latch-in all zeroes or all ones condition. The signal from the $\overline{Q}$ output of flip-flop 412 is also applied to the RESET input on flip-flop 414, and upon the reception of eight consecutive ONES or ZEROES, flip-flop 414 is released to be clocked by RXCLK, establishing a logic "0" on the $\overline{Q}$ output. Flip-flop 414 causes a bit skip by holding the flip-flop 408 reset for one bit period to account for the ninth one or the phase shift for ZEROES. After the $\overline{Q}$ output of flip-flop 414 has gone to a logic "0", releasing flip-flop 408, the next ZERO received, which should be the first bit of the SYNC character, establishes the ADV1 signal to cause the control logic to advance from State 1 to State 2.

The control logic identifies the ONES field in the probe and resolves the phase ambiguity introduced by the receiver following a signal presence indication. The detection of the nine ONES in the probe occurs during State 1 while the control logic is sitting in the idle state waiting for a probe to be received.

Detection of the ONES field proceeds with received data bits being shifted into 8-bit shift register 416a, 416b by RXCLK. The received data bits are held in shift register 416 and the complement of the data bits stored in shift register 416 is provided by a group of inverters 418. The complement of the data bits held in shift register 416 are applied to an 8-input NAND gate 420. If all eight bits of the received data are ZEROES, a logic "0" will be provided from NAND gate 420.

Combination logic comprising 4-input NAND gates 422 and 424 along with negative true AND gate 426 provides logic for detecting the presence of eight consecutive ONES.

If all zeroes were detected, inverter 428 will apply a logic "1" to both the J and K inputs of flip-flop 430. The negative-going transition of the logic signal on the $\overline{Q}$ output of flip-flop 412 is applied as a clock to flip-flop 430 causing it to toggle and invert the phase and provide a phase correct signal to the receiver.

Flip-flop 412 can be reset by a signal initiated through NOR gate 434 and inverting circuit 436 by flip-flop 438. A logic "1" on the $\overline{Q}$ output of flip-flop 438 is established by the condition of the signal presence SP indication from the receiver. The logic "1" on the $\overline{Q}$ output is removed following a a count of eight data bits following the existence of a signal presence SP indication. That is, for eight bit times following the existence of a signal presence indication from the receiver, of a signal presence indication from the receiver, the logic for generating the advance to State 2 signal is inhibited.

Upon a later return to State 1, as indicated by a logic "1" being established on ST1 at the input of NOR gate 434, flip-flop 412 is released to repeat its sequence of operation and again find the first valid occurrence of all ONES or all ZEROES.

State 2, ST2, is entered immediately following detection of the nine ONES and subsequent generation of ADV1. During this state, the control logic must detect the SYNC character and valid MODE field. Since the first SYNC character bit has been received, only seven more bits are to be received for the SYNC character and a valid MODE field to be present. An 8-input NAND gate 440 is enabled by the CNT signal or by a CNT 7 signal received from counter 380 in FIG. 11. The existence of a valid MODE field is checked by Exclusive-OR gate 442. If the SYNC character and a valid MODE field are present, a SYNC indication is provided from Exclusive-OR gate 444 to generate ADV2 from gate 446 and allow advancement to State 3.

State 3, ST3, is the control logic state during which the probe address is received and checked. The 5-bit count field is received first followed by the variable number of address bits. If the station is not being addressed, the logic returns to State 1. If the station is being addressed, the control logic is advanced from State 3 to State 4.

Figure 13:
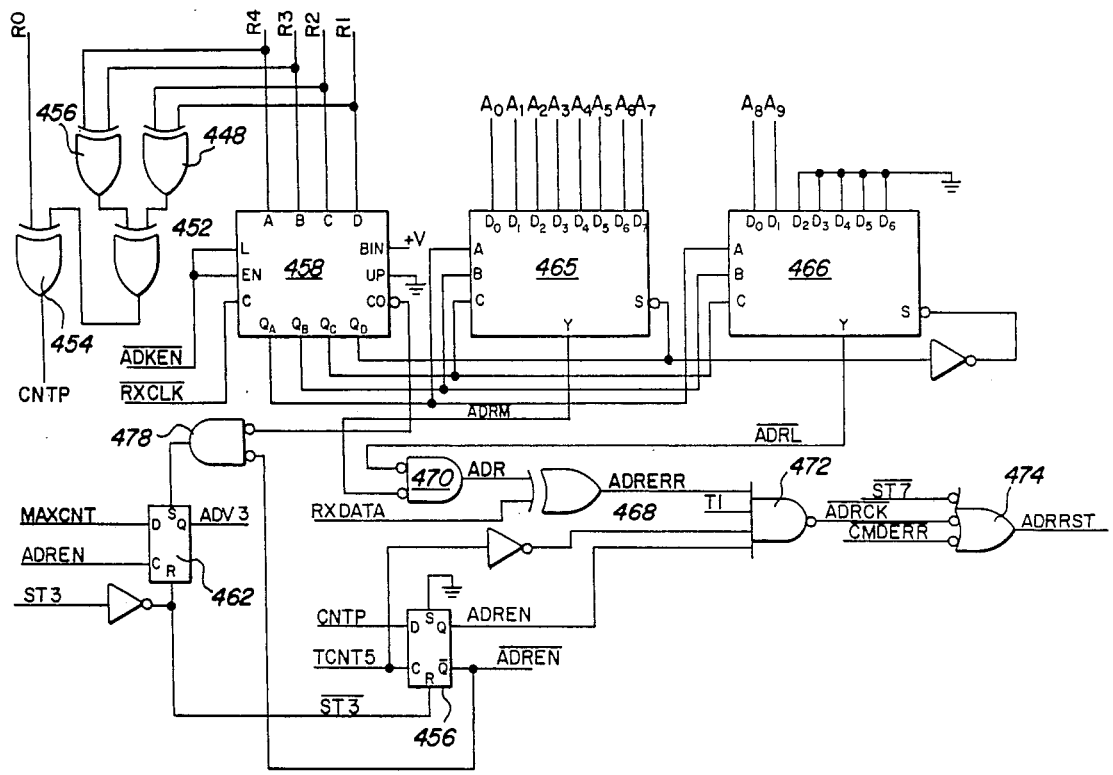

The probe address field is analyzed in State 3 by the logic shown in FIG. 13.

The 5-bit count field, including the odd-parity bit is received in shift registers 416a, 416b. Parity of the count field is checked by Exclusive-OR gates 448, 450, 452 and 454. If parity checks, a signal CNTP is generated by gate 454 and applied to the D input of flip-flop 456. The signal TCNT 5 from AND gate 388 in the field bit count logic of FIG. 11 clocks flip-flop 456 to set an address enable signal ADR EN.

The four count bits are applied as inputs to binary counter 458. The signal address enable ADR EN enables RXCLK to latch the address bit count into counter 458 and present at the counter output lines the address bit count. If the address bit count is ZEROES or ONES, as indicated by a maximum count signal generated by NAND gate 424 in FIG. 12 and made available through inverter 460 to flip-flop 462, ADR EN clocks flip-flop 456 and set ADV3 for default addressing and immediate advance to State 4. For any other count, counter 458 sequentially selects remote station dress bits $A_0$ through $A_9$ from hard-wired address code lines 465. To sequentially select station address bits, the output code of counter 458 is applied to data selectors 464 and 466. The remote station address bits are also supplied to data selectors 464 and 466, with address bits $A_0$ through $A_7$ being applied to selector 464 and the remaining two address bits, $A_8$ and $A_9$, being supplied to selector 466.

As counter 458 counts under the direction of $\overline{RXCLK}$, the binary code at the output of the counter changes sequentially, causing data selectors 464 and 466 to select one of the address bits at a time for comparison at Exclusive-OR gate 468 with each received bit on the RXDATA line. Selected address bits from data selectors 464 and 466 are supplied to gate 468 through AND gate 470.

The output of Exclusive-OR gate 468 is a logic "0" if a received data bit compares with the corresponding address bit. Any received bits that do not compare with the selected address bit results in a logic "1" output from gate 468 which is applied to NAND gate 472. The signal ADR EN from flip-flop 456, the synchronized pulse signal T1 from shift register 374 in the timing chain logic, and the count five signal TCNT5 signal are also applied to NAND gate 472. If a received address bit does not compare with the selected address bit in the remote station address code, the output of NAND gate 472 causes an address reset signal ADRRST to be issued from OR gate 474. This signal is applied to AND/OR logic 397 in FIG. 11 to cause counter 394 to be returned to State 1.

As each bit of received data is checked, counter 458 decrements until it reaches a zero count indicating that the appropriate number of bits have been checked. A carry-out signal from counter 458 is applied to AND gate 478 which sets flip-flop 462 to indicate address acceptance by issuing an ADV3 signal.

Address redundancy bits are implimented by applying $\overline{RXDATA}$ to the appropriate address bit lines Ax to cause Exclusive-OR gate 468 to compare RX DATA to RX $\overline{DATA}$ in redundancy bit positions. Accordingly, those bits are eliminated from consideration.

State four, ST4, is a state having two modes of operation. In Mode 1, State four is a null state. It is stepped through in one bit period to State five by the issuance of the advance signal ADV4 from OR gate 480 in FIG. 12. An indication of a Mode 1 operation for the remote station is provided by flip-flop 482, the $\overline{Q}$ output of which is applied to OR gate 480. The D-input of flip-flop 482 receives the R1 bit from shift register 416a, and flip-flop 482 is clocked by the State three, ST3, signal. If a Mode 2 signal has not been received, flip-flop 482 enters an indication of such mode status. In Mode 2, State four of the remote station is a state in which a command or text is being sent to the addressed remote station. The detection of a Mode 2 probe by Exclusive-OR gate 448 is entered in flip-flop 482 by the setting of that device upon entry into State three.

If the first bit received in State four of a Mode 2 operation is a zero, flip-flop 484, which receives the R0 bit from shift register 416a and is clocked by TCNT1 from the field bit count logic, remains reset. This condition indicates that duplicate copies of an 8-bit command field are being sent. The first eight bits are shifted into the receive shift registers 416a, 416b, whereupon CNT8 sets flip-flop 486 to enable character logic comprising flip-flop 488 and Exclusive-OR gate 490. The second copy of the 8-bit command field is received and compared bit by bit with that previously received and contained in shift registers 416a, 416b. Any errors in the duplicate command field results in flip-flop 488 being set, initiating a command error CMDERR signal and a return to State one. The return to State one is accomplished by the application of the command error signal to OR gate 474 in FIG. 13 which generates an ADR RST signal that causes counter 394 in FIG. 11 to be preset to the one count.

If all eight bits compare, NAND gate 492 generates a command enable signal CMDEN to enable decoder 494 in FIG. 12 to permit command signals to be passed to external devices. OR gate 480 then receives a reply indication, causing an advance of the control logic to State five.

Decoder 494 decodes the second, third and fourth bits of the command and makes a one-of-eight discrete code lines available to the external device.

If the first bit received in State four of a Mode 2 operation is a one, flip-flop 484 is set and initates an ALPHAMODE to indicate that the text being received is to be delivered to the external logic device for processing. The external logic device will then generate an ALPHAERR or ALPHAADV to return the control logic to State one or advance it to State five. If the external logic device does not have the capability to accept data of this type, all ALPHA lines are left open causing ALPHAERR to be signaled by default.

State five, ST5, is entered whenever the probe has been received successfully and commits the remote station to the transmit sequence. The transmit sequence is entered whenever a valid Mode 1 or Mode 2 probe that addresses the remote station is received. When the remote station switches from the receive mode to the transmit mode, the transmit-receive switch 120 in FIG. 6 is moved to the transmit position. Power must be applied to the power amplifier 146, and the exciter 144 must be turned on and presented with a data stream.

Figure 14:
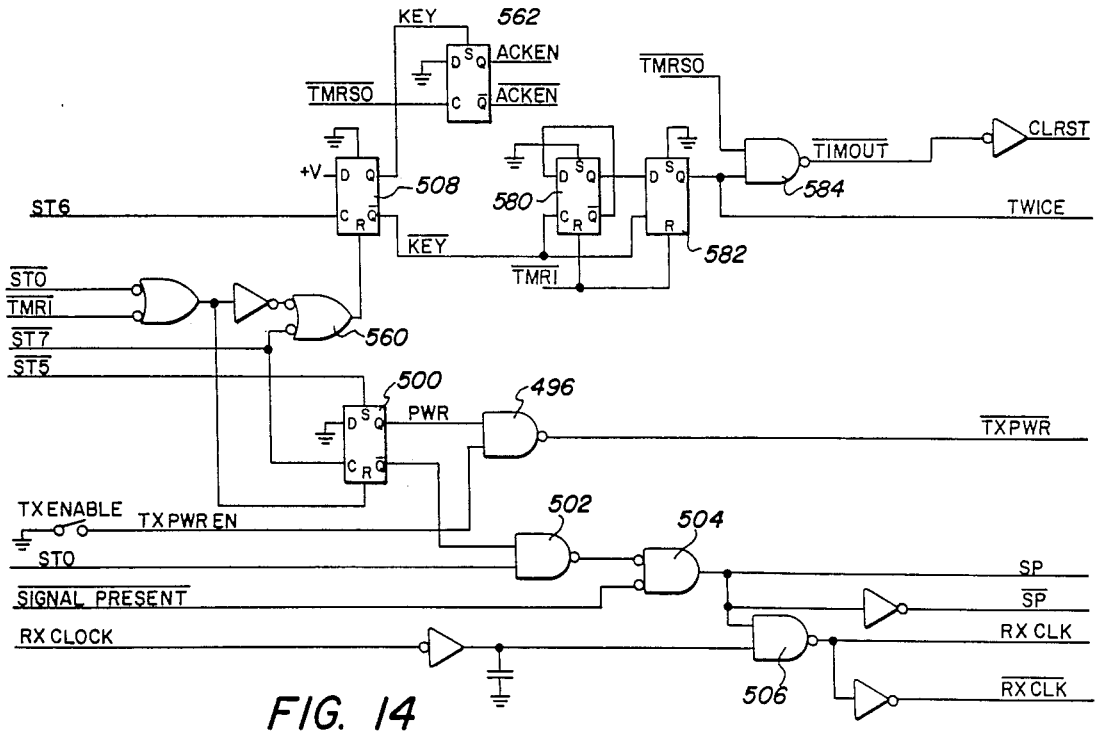

Logic for turning on transmitter power and setting the transmit-receive switch is shown in FIG. 14. A TXPWR signal is generated from NAND gate 496 in response to opening of transmit power enable switch 498 and setting of flip-flop 500 by the ST5 signal. The $\overline{Q}$ output of flip-flop 500 is applied to combination logic comprising NAND gate 502 and AND gate 504. Accordingly, the power PWR signal from flip-flop 500 gates the signal presence signal SP to change the timing change synchronization from the receive clock available from NAND gate 506 to the 2 kHz transmit clock TXCLK available from counter 370 in FIG. 11. The control logic then advances immediately to State six.

State six, ST6, is the transmit reply state during which all data to be transmitted by the remote station is output. In all cases, a field of nineteen ONES is transmitted followed by a SYNC character and the station address. This sequence is called the Preamble. The Preamble allows the master station to lock onto the remote station signal and identify the station. The exciter key signal KEY from flip-flop 508 enables the transmission of data.

Figure 15:
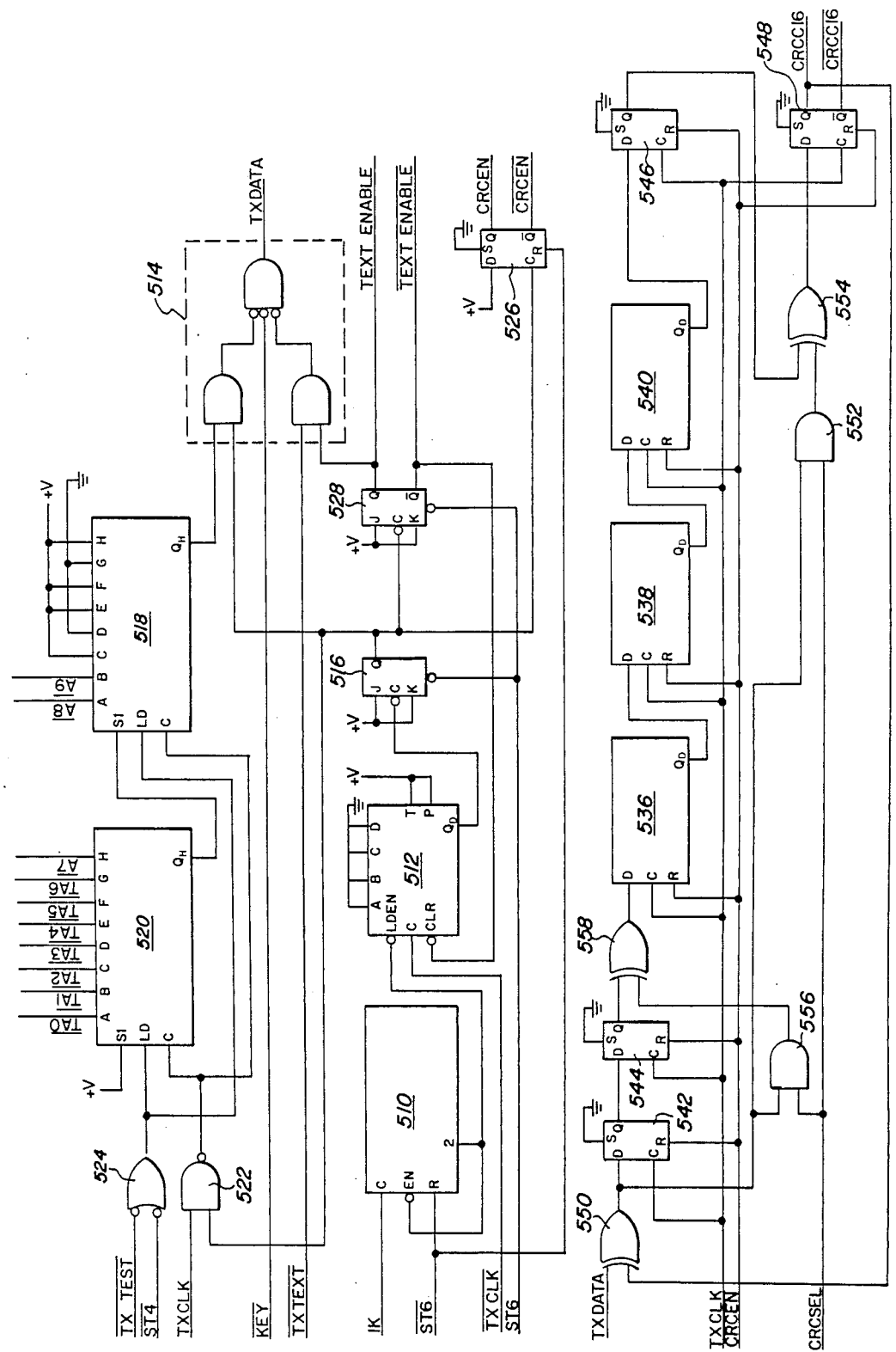

Remote station transmission proceeds only after the master station acquires the transmitted signal and identifies the signal source. As briefly outlined above, the master station locks onto the remote station signal and identifies the remote station by the Preamble that is generated by the remote station. Logic for generating the Preamble is shown in FIG. 15 and is enabled when State six is entered.

A five-stage Johnson decade counter 510 and a synchronise 4-bit counter 512 cause a nineteen bit time delay, during which TXDATA from AND/OR logic 514 is held to a logic "1". This time delay permits the master station to have 9.5 milliseconds in which to acquire the signal. Following the time delay, flip-flop 516 is set to allow the SYNC character and station address to be shifted out of 8-bit static shift registers 518 and 520 and inserted into the data stream through logic 514. Shift registers 518, 520 are clocked by TXCLK through NAND gate 522, with TXCLK being gated by the signal available from flip-flop 516. Loading of the bits to be shifted out of shift registers 518, 520 into the data stream is controlled by signal conditions present at the inputs of OR gate 524 which supplies the "load" signal.

The setting of flip-flop 516 further sets flip-flop 526 and enables check character generation. The CRCEN signal from flip-flop 526 is applied to the cyclic redundancy check character generator logic shown in the lower portion of FIG. 15. Both the SYNC character and station address are included in the character check.

The setting of flip-flop 516 further sets flip-flop 528 to provide a TEXT ENABLE. Setting of flip-flop 528 enables the Mode 1 data stream text to be transmitted. In Mode 2, flip-flop 530 is set by the signal MD2 to by-pass text transmission. In Mode 1, the text is provided by the external logic device as DATA OUT to flip-flop 532 via combination logic 534. The external logic device continues to supply DATA OUT until the COMPAR input to flip-flop 530 goes to a logic "1" and sets flip-flop 530 indicating the end of text.

Every transmission from a remote station is concluded with a 16-bit cyclic redundancy check character CRCC16. This character is generated during data transmission. When flip-flop 530 is set, generating CRCSEL, the sixteen bits of cyclic redundancy check character are inserted into the transmit data stream through logic 534, flip-flop 532 and logic 514. The check character is formulated in a 16-bit shift register comprising shift registers 536, 538, 540 and flip-flops 542, 544, 546 and 548. The cyclic redundancy check character generator logic is supplied with the data stream TXDATA being transmitted, and with the transmit clock TXCLK. The data stream is applied to Exclusive-OR gate 550 which feeds flip-flop 52 of the shift register chain. The transmitted data bit is compared with the output of flip-flop 548 at gate 550. The output of gate 550 is also fed to logic comprising AND gate 552 and Exclusive-OR gate 554. The output of 550 is also applied to a second group of similar logic comprising AND gate 556 and Exclusive-OR gate 558. The output of gate 558 is applied to shift register 536.

Following selection of the check character for transmission, counter 380 in FIG. 11 is enabled by the CRCSEL signal applied to NAND gate 385. During transmission of the check character, counter 380 counts until a total count of seventeen has been reached, whereupon AND gate 392 issues the ADV6 signal advancing the control logic to State seven.

State seven, ST7, is the transmitter Off sequence. At the completion of transmission, TX KEY is turned Off by flip-flop 508 in FIG. 14 being reset through OR gate 560. Simultaneously, flip-flop 500 is clocked and the signal TXPWR is removed, turning off transmitter power.

After a transmission, the control logic is returned to State one by a signal to counter 394 in FIG. 11 from decoder 396 through OR gate 474, OR gate 476 and logic 397. In State one, the control logic awaits reacquisition of the master station signal. In normal operation, the master station will acknowledge receipt of a valid transmission by inserting an acknowledge ACK character in the probe in place of the SYNC character. Only a remote station that has transmitted within 50 milliseconds and is addressed by the prove is enabled to receive the ACK character. Flip-flop 562 in FIG. 14 is set by the transmit key signal KEY from flip-flop 508 to provide an acknowledge enable signal ACKEN. Flip-flop 562 is clocked by a signal TMR50 derived from one-shot multivibrator circuit 564 which is triggered by a signal from OR gate 566. Multivibrator circuit 564 includes external timing components capacitor 568 and resistor 570 and provides a 50 millisecond time-out following the completion of a data transmission as indicated by a logic "1" on the ST7 input line. A 50 millisecond time-out signal, indicating that the remote station has transmitted within the past 50 milliseconds is applied to NOR gate 371 to set flip-flop 368 through OR gate 369 in the timing chain control logic shown in FIG. 11. The setting of flip-flops 368 initiates CLKON to re-establish operation of the timing chain logic. The $\overline{ACKEN}$ signal from flip-flop 562 is applied as an enabling input to AND gate 572 in FIG. 12. Eight input NAND gate 574 decodes the acknowledge character with an acknowledge pending signal being provided by flip-flop 576 in response to a signal from gate 572. After an acknowledge pending signal is sent, the acknowledge character is checked against the probe address by AND gate 578. The ACK pulse is then provided as an output to the external logic device where it may be utilized to set some condition in that device.

If the master station signal is still present and the remote station is still addressed, but there is no acknowledge character in the probe, a second transmission will be allowed. It is assumed in this situation that the master station did not receive an error-free first transmission. The remote station is, however, prevented from providing more than two transmissions within the time frame determined by one-shot multivibrator circuit 400 in FIG. 12 to prevent overheating of the power amplifier and excess battery drain.

The logic for controlling repeat transmission is shown in FIG. 14. Until a TMR1 signal is applied to flip-flops 580 and 582, a repeat transmission can be provided. However, following the timing out of multivibrator 400 following a first transmission by the remote station as indicated by one-shot multivibrator 564, a $\overline{TIMOUT}$ signal is generated from NAND gate 584. A $\overline{CLRST}$ signal from inverter 586 in response to the $\overline{TIMOUT}$ signal puts the control logic back to State 0.

MASTER STATION PROBING SIGNALS

The master station software is under control of a combination interrupt/commutator operating system. Realtime software is executed under control of the interrupt monitor which receives and identifies interrupts, stores status for later return to the operating environment and delivers control to the appropriate real-time data reception, teletype and modem input/output, real-time clock, and power monitor.

Polling or probe signal generation is initiated whenever the master station computer receives a command to initiate a NOMINAL or AD-HOC poll. The near-real-time (NRT) prove schedule routine determines the appropriate probe sequence to interrogate the required remote stations, turns the transmitter on and initiates the poll.

Once the NRT probe routine initiates the polling, it becomes the responsibility of the real-time (RT) probe generation routine to generate the continuous, uninterrupted probe—including insertion of the acknowledge sequences when remote replies are received. The RT probe routine supplies the appropriate data words to the probe generation hardware to cause it to generate the required probe. The probe is repeated continuously until the NRT probe schedule changes or deletes the probe requirements.

When the master station receiver receives remote data, it presents each bit, as it is received, to the master station computer. At this point the real-time routine performs the preliminary data processing. First, the software finds the synchronization character to verify that there is a proper locking on the incoming data. The next ten bits are then received and assembled as the unique address of the transmitting remote station. The software will multiplex the outputs of two receivers simultaneously. In the use of four receivers, the hardware logic will gate two receivers at a time to the computer, inhibiting the other two receivers for the duration of the reception.

Once the master station has identified the transmitting remote station, it references that remote's status table to determine the format and length of the data stream being transmitted by that remote. The appropriate number of data bits are then received and stored for further processing. And as each bit is received, it is entered into the calculation of the cyclic redundancy check character. At completion of data reception, including reception of the 16-bit check character, the check character calculated by the RT receive software will be zero if all bits, including the remote address, have been received correctly. If the data has been received correctly, the real-time probe routing immediately sends an acknowledgment to the transmitting remote and the near-real-time software is directed to continue processing, logging, and storage of the received data. If the data has not been received correctly, it is discarded.

A real-time power monitor routine will be immediately called any time the processor power monitor detects a power drop. This routine will turn off the transmitter and store current operating status. It will then protect core storage and halt the computer to prevent data loss during the immanent power failure.

When power is reapplied to the system, the processor power monitor will automatically restart the computer in the power montior routine. System status will be re-established and, after appropriate time dealy for transmitter warm-up, the transmitter and probe generation will be turned on. Also, the service center 10 will be notified of the time of the power failure and it will be requested to update the computer's real-time clock so the central can re-establish time-of-day and scheduling requirements.

Figure 16:
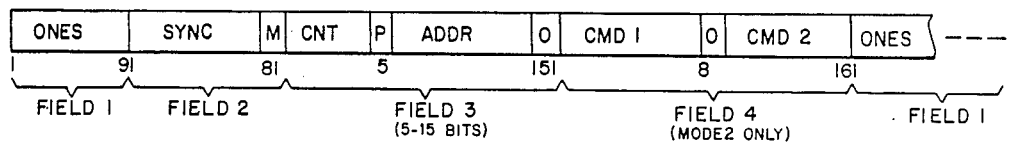
FIGS. 16-18 are outlines of the formats for communication messages between a master station and remote stations.

The master station polling or probing signal comprises four data fields transmitted continuously in search for a communications link to a remote station. As shown in FIG. 16, the first data field consists of nines ONES and is used by the remote stations to determine proper bit phase. This is necessary as the transmitted data is Manchester coded and has an ambiguity between the first half and second half of each bit. Therefore, each remote station that hears the master station probe must search for the nine ONES field first. If it finds a ZEROES field instead, bit phase is known to be reversed.

As shown in FIG. 16, the second data field in the probe contains a six bit SYNC character and a two bit mode indicator. The remote station must receive the SYNC character immediately following the ONES field to verify that it has proper synchronization with the transmitted probe. The mode bits must either be 01 or 10 for Mode 1 or Mode 2, respectively. Mode 1 requests data and Mode 2 is a command feature.

The third data field, as shown in FIG. 16, contains the address of the remote station or stations that are to respond to the probe. The address field contains three parts. First is a four bit count field which specifies how many address bits are being transmitted. Second is a parity bit which provides odd parity over the count field as a check that the count was received correctly. Third are the address bits. There may be from 0 to 10 address bits as specified by the count field, and all address bits transmitted must agree with the appropriate bits in the remote station's address in order for that remote to respond to the probe. For example, if three address bits are transmitted, they must be identical to the most significant three bits of the remote station's ten bit address for that remote to be addressed.

If no address bits are transmitted, every remote station is, by default, addressed. If ten address bits are transmitted, they must compare with all ten of the remote station's address bits, and thus only one remote can be addressed. It may thus be seen that the present polling technique allows for selective polling of all remote stations, a selected group of remote stations or an individual remote station.

The fourth field is present only for Mode 2 probes containing commands. If the first bit of the fourth field is a logic zero, then two copies of a seven bit command are being sent and the remote station must receive and compare both copies of the command in order to accept it. If the first bit of the fourth field is a logic one, then the data contained in field four is to be routed to an external device. The external device must process the data and make the accept/reject decision.

Figure 17:
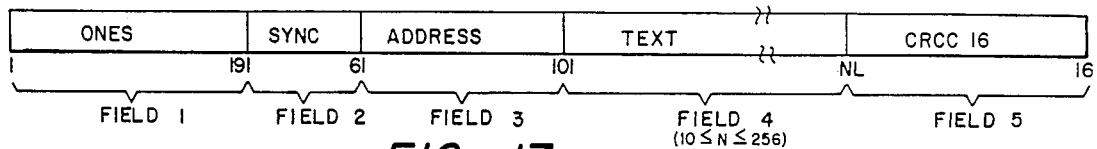

Whenever the remote station receives correctly the master station probing signal and determines that the remote station is being addressed, it will transmit a reply to the master station. The data field of the remote station reply is shown in FIG. 17. The reply will always contain the preamble and the 16-bit cyclic redundancy check character (CRCC-16). In Mode 1, it will also contain the data being held in the remote station.

As shown in FIG. 17, the remote preamble consists of a nineteen bit ONES field, used to provide a time delay to allow the master station time to acquire the signal, a SYNC character, used to allow the master station to verify proper frame synchronization, and the remote's unique 10-bit address, identifying the remote to the master station.

In Mode 1, the text is transmitted next. Text may consist of from 1 to 255 bits and is data that is entered from the sensors associated with the remote station. In this case, forty-eight bits are sent for four sensors plus four bits clock count. The response is completed when the CRCC-16 code is transmitted. The CRCC-16 is generated over the address field and the data field and thus verifies both remote identification (even in Mode 2) and correct reception of the text.

Figure 18:
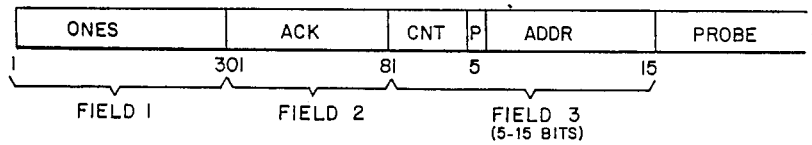

The master station may acknowledge proper reception of the remote station data by responding to the reception with the ACKnowledge sequence. The field for the sequence is shown in FIG. 18. This sequence comprises a field of thiry ones, during which the remote station reacquires the signal after transmitting, and eight-bit ACK character, and a remote address. Only a remote station that has transmitted in the last 50 milliseconds may accept the ACK and inhibit transmitting for the preset time of the inhibit timer (e.g., for ½ hour). Once inhibited, a remote staion may only respond to a master station Mode 1 signal if it is uniquely addressed or the probe address field (field three) is all ONES, indicating a universal poll wherein all remote stations must resond.

The remote station addressing scheme used by the present polling technique provides a great deal of flexibility in grouping and selecting remote stations that will repond to any given probe. Each remote station can be addressed uniquely or as part of various groups. Group size can vary from one (unique) to 1024 (all) according to the number of address bits used.

As shown in FIG. 16, the address format used contains from 5 to 15 bits in the address field. Each remote station has a unique 10-bit address (0 to 1023). In order to respond to a probe, a remote station must find in the probe its address or the most significant bit portion of its address. The count portion (CNT) of the probe address fields specifies the number of address bits transmitted. A parity bit, P, is transmitted as a check bit on the count. If the count is zero, CNT=0, then there are no address bits and all remotes are addressed. In this case the total address field is five bits, CNT+P.

Figure 19:
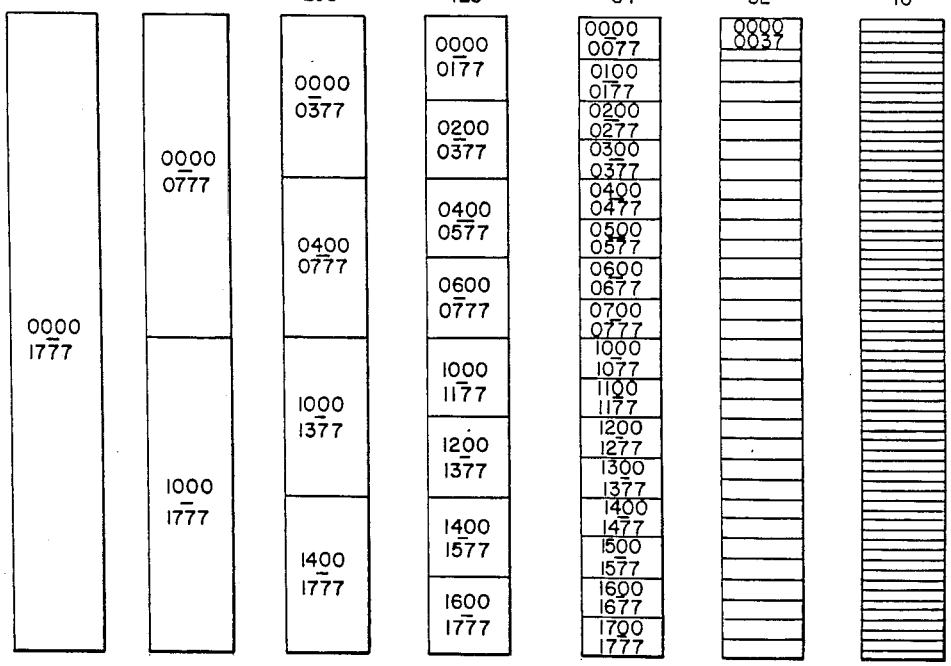
FIG. 19 is an outline remote station address structure.

If CNT=1, there is one address bit and a remote station is addressed only if its most significant address bit is equal to the bit transmitted. Since there are two possible states for the transmitted address bit (0 or 1), half of all possible remotes will be addressed, defining two groups: remotes 0000–0777 will respond to 0 and remote 1000–1777 will respond to 1. FIG. 19 shows this example and other examples as the address is increased in length, for CNT=2, 3, 4, 5 and 6. In each ease, the number of bits in the transmitted address increases by 1, doubling the number of groups addressed. For example, CNT=2 has groups 00, 01, 10, and 11 and cuts in half the number of remotes in each group. When CNT=2, the two most significant bits of a remote's address must match the transmitted address. This structure continues to CNT=10 (address field size 15) where there are 1024 groups of remotes with one remote in each group (e.g., unique addressing).

In the above description, it was assumed that all remote stations must be addressed by their exact address in order to respond to a received probe. As shown in FIG. 19, this results in each remote being included in one and only one group at each level of addressing. However, it may be desired to have a remote reply to more than one probe at any given level. For example, assume the probe contains CNT=2, defining four groups as shown in FIG. 19. Remote 0000 would respond only if group 00 were being probed. But assume it is desired to have this remote station also reply to a group 01 probe. Then the remote station would have to ignore the second address bit in order to find an address to which it could respond. This can be accomplished by setting the second bit of the remote receive addres to a "don't care" condition, i.e., the remote does not care whether the second bit of the received address is a one or a zero, creating the addressing redundancy that allows the remote to answer either group 00 or group 01 probes. Any of the first five bits of a remote's receive address may be made redundant.

However, the transmit address always remains unique. The receive address redundancies and the transmit address are determined by the address plug at each remote and must be assigned as part of the system definition and can only be changed by changing the address plug at the remote.

The primary application of the redundancy bits in the remote receive address shown in FIG. 16 is to allow flexibility in assigning remote stations to master stations in a multiple master station system such as shown in FIG. 1. Normally, a remote station that is "in range" of two or more master stations will be assigned primarily to one particular master station. That master station will probe an address to which that remote station will reply while the other master station will probe an address to which that remote station will not reply. Such a remote station is "exclusively" addressed by a particular station. Of course, either master could use a more general address or the other master's probe to communicate with remotes not primarily assigned to it. If it is desired to have a remote assigned to either of the master, the remote's receive address is made sufficiently redundant to allow it to respond to either master. In effect, this remote station now receives double coverage.

Once a remote station is assigned to a master station or stations, it is desirable to be able to assign the remote station to answer specific probes that that master station will use. If each master uses four probe patterns to address all of the remotes assigned to it, then it my be desirable to assign each remote exclusively to answer one probe, to answer any two of the probes, or to answer all of that master's probes. Selecting redundancy for the probe bits that control these replies will allow each remote to perform as required.

When the present system is installed at a particular field site, there are several site factors which must be taken into consideration. First, if a station is line-of-sight to any of the master stations, then it will be probed uniquely in sequence with other line-of-sight remotes.

If a remote station is not line-of-sight and is located in a good area, distant from other remotes, it may be addressed in any manner desired. If this remote station is within a few miles of another remote station, then master assignments and probe assignments of all remotes in close priximity must be exclusive so that two or more remotes will not continue to answer the same probe simultaneously, thus nullifying each other. Finally, if the remote site has a low performance factor due to long range or poor horizon, the remote address must be provided with sufficient redundancy to allow it to respond to a large percentage of the probes and any of the masters that it may hear.

Another important aspect of the invention is that the portable field test units 18 can also communicate and be probed by either of the master stations. The portable field test units can transmit a 16 character message in response to any mode 1 probe from a master station that addresses the portable field test unit or a remote station through which the portable field test unit is transmitting. The first seven bits of the portable field test unit receive address are redundant, so the portable field test units are virtually always addressed. When a portable field test unit is utilizing a remote station transceiver, a portable field test unit address plug is normally inserted into the remote station transceiver to insure response to all probes.

Figure 20:
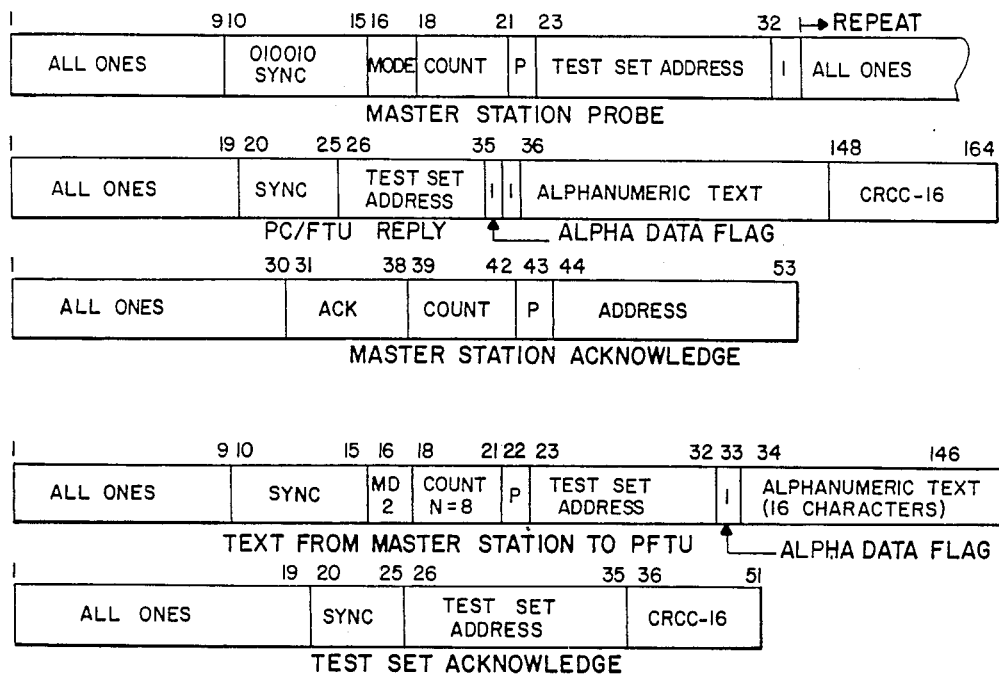
FIG. 20 is a diagram of formats for communication messages between a master station and a portable communications and field test unit.

The portable field test unit message reply format is shown in FIG. 20. As in all remote station replies, the ones field and the SYNC character are transmitted first, and then the portable field test unit address. Bit 35 is a one to indicate that a ASCII message follows. Bit 36 is a dummy bit generated by the portable field test unit microprocessor. The sixteen 7-bit (6-bit plus parity) ASCII characters follow and the CRCC character verifies the data stream. The standard ACK sequence from the master station allows the portable field test unit to delete the transmitted message from its transmit cue.

FIG. 20 also illustrates the probe format for transmitting in ASCII message from a master station to a portable field test unit. There are two techniques for transmitting this message. If a dedicated probe is transmitted which uniquely addresses a portable field test unit with a mode 2 probe, bit 33 is set to indicate the mode 2 information is ASCII text rather than a command. The sixteen character message follows, and the hold probe is transmitted continuously until the portable field test unit ACK acknowledge is received to verify reception. An alternate technique transmits the message only in response to a receive message from the portable field test unit in question. The single message replaces the normal ACK to the portable field test unit and the ones field is extended to thirty ones to allow the remote station to acquire signal.

The performance of a meteor burst communication network is primarily dependent upon the time interval between successive meteor burst reflections. The diurnal and seasonal variations of the average number of bursts are natural phenomena and cannot be altered. However, the number of usable bursts, or reflections, can be improved by optimumly adjusting the various physical system parameters.

The occurrence of sporadic meteors are random events and the interval between these occurrences are Poisson distributed. Therefore, the probability that a meteor burst reflection will occur after a certain time $t_0$ can be expressed by:

$$P(+ \leq t_o) = (1 - e^{-\bar{n} t_o})$$

where $\bar{n}$ is the average number of meteor burst reflections that occur during one hour. Therefore, for a meteor burst network of 160 remote stations, the communication link with each remote station will be an independent event and the probability of communicating with all 160 stations, during a give time $t_o$ can be expressed as:

$$P = (1 - e^{-\bar{n} t_o})160$$

The probability of communicating with each remote is, therefore, both burst ($\bar{n}$) and time ($t_o$) dependent. The system design should maximize these values so that the percentage of remote stations that can be expected to respond within the prescribed time period will be at a maximum.

The system response time can be predicted using the cumulative binomial distribution. The expression used to calculate the probability for exactly x out of n remote stations successfully responding is:

$$P(x) = \frac{n!}{x!(n-x)!} p^x q^{n-x}$$

where
n = total number of stations
x = total number of stations responding successfully
p = probability of single station success
q = 1 − P The probability of "X" or more stations successfully responding is:

$$P(>x) = \sum_{i=x}^{n} \frac{n! \, p^i q^{(n-i)}}{i! \, (n-i)!}$$

The system performance as a function of message length is defined by the equation below:

$$\bar{n} = M e^{\frac{Tx}{Td}}$$

where
Tx = message length in seconds
Td = burst time constant, seconds
M = system constant
$\bar{n}$ = usable meteors per hour

COMPUTER PROGRAM FLOW CHARTS

As previously noted, each of the master stations 12 and 14 include programmable digital computers which operate to control various aspects of the probing and reception of data. Due to the large number of remote stations associated with the master station, the acquisition of data by the polling of remote stations is an important aspect of the present invention. The present polling technique enables the selective interrogation of any selected remote station, or any selected group of remote stations, and includes techniques for eliminating the interferences from other acknowledging remote stations and due to weather conditions and the like.

Figure 21:
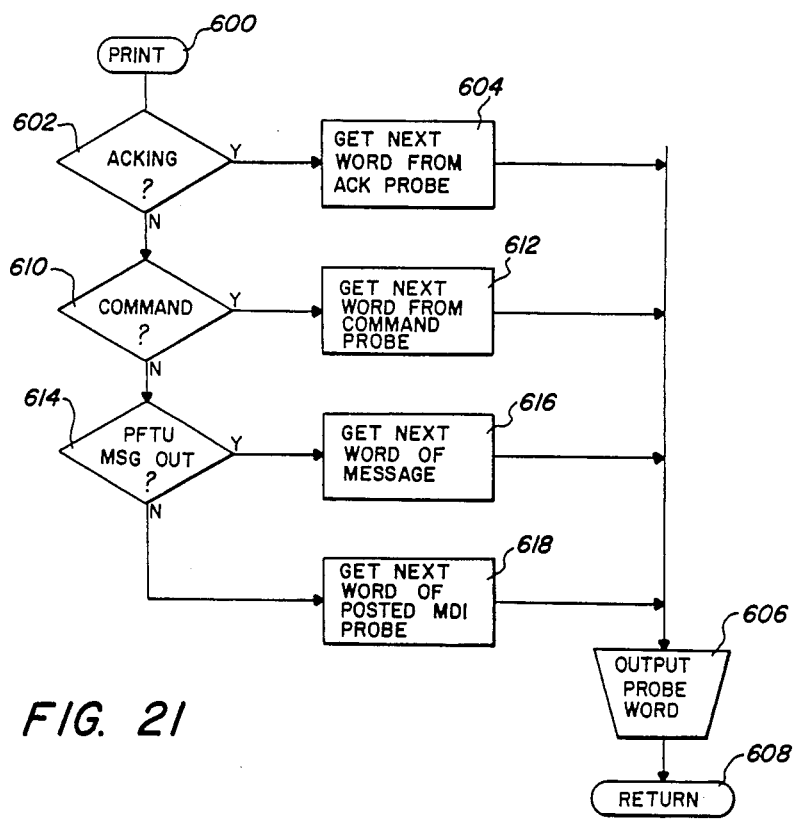
FIGS. 21-27 are flow diagrams illustrating subroutines relating to the generation by the digital computer of polling sequences and probes.

FIG. 21 is a flow diagram of a polling interrupt routine that determines what type of a polling sequence is presently being transmitted by a remote station.

The program initiates at 600 and determines at 602 whether or not the master station is presently generating an acknowledging signal to a remote station. If the system is generating an ackowledge signal, the next word is obtained at 604 and is output at 606 and the system returns at 608 to finish last state at 600.

If an acknowledge signal is not presently being generated by the master station, a decision is made at 610 as to whether or not a command signal is being generated by the master station.

As previously noted, master stations may transmit an eleven-bit command signal to selected remote stations in order to turn selected sensors on and off, to collect data at a different rate or to control the operation of various input/output units attached to the remote station. If the command signals are being generated by the master station at 610, the next word is obtained at 612 and the word is output at 606.

If the master station is not presently generating a command signal, a decision is made at 614 to determine whether the system is in the process of sending a message to a portable field test unit. If so, the next word of the portable field test unit method is obtained at 616 and is transmitted at 606. If no message is being transmitted to the portable field test unit at 614, the system is doing a conventional probe and the next character of the probe message being transmitted is retrieved at 618 and is output at 606 for transmission. Normally, the word retrieved at 618 will be a Mode 1 probe in either a nominal poll, an ad-hoc poll or a background poll. As previously noted, a nominal poll comprises the generation of a probing signal which encompasses all of the remote stations associated with a master station. An ad-hoc probe comprises a polling sequence for communicating with a specific selected group of remote stations with as little communication as possible with the remainder of the remote stations. A background polling sequence communicates with specific remotes when nominal or ad hoc polling are not in progress, and is typically used last to allow communications with portable field testing units.

Figure 22:
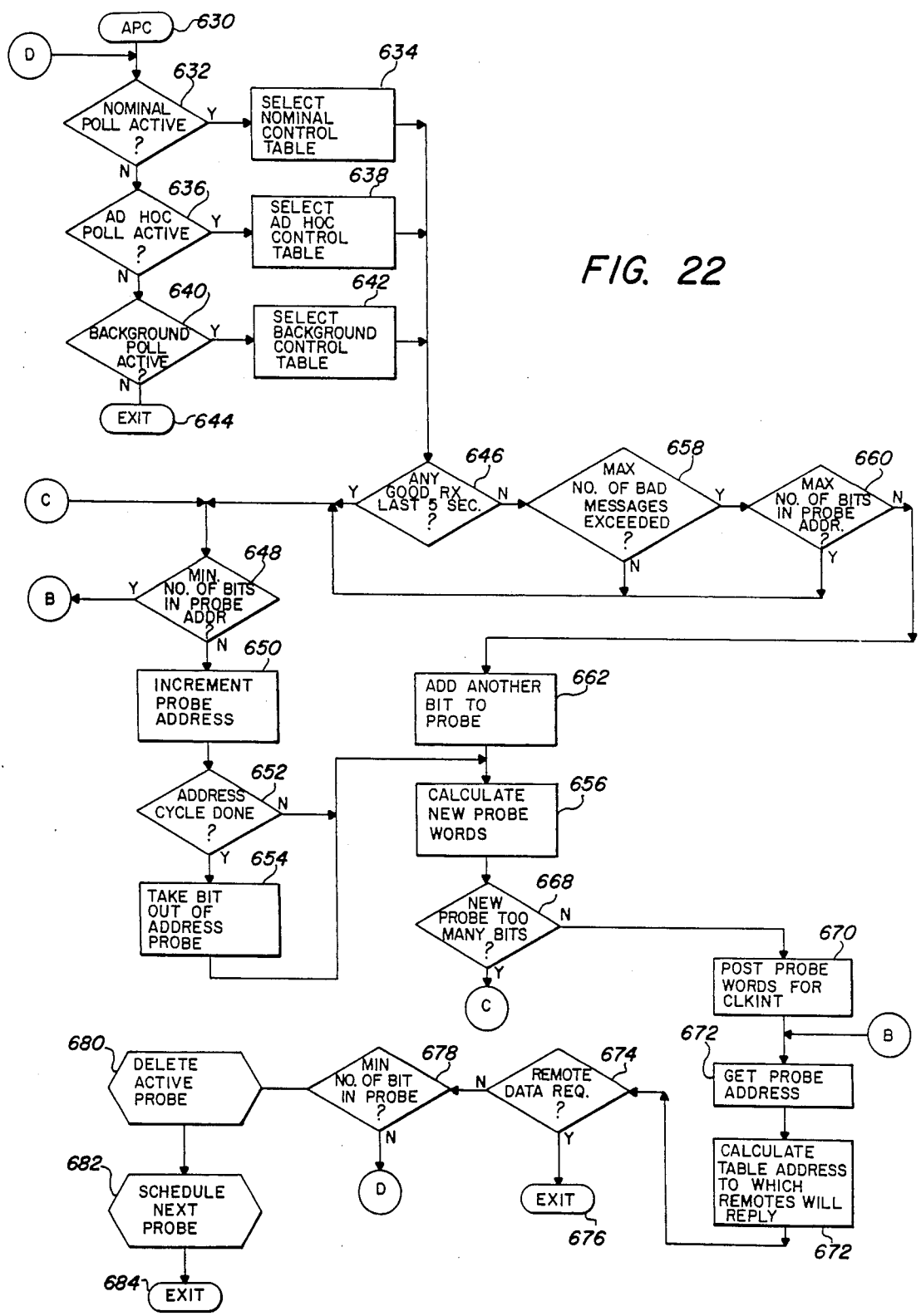
Figure 23:
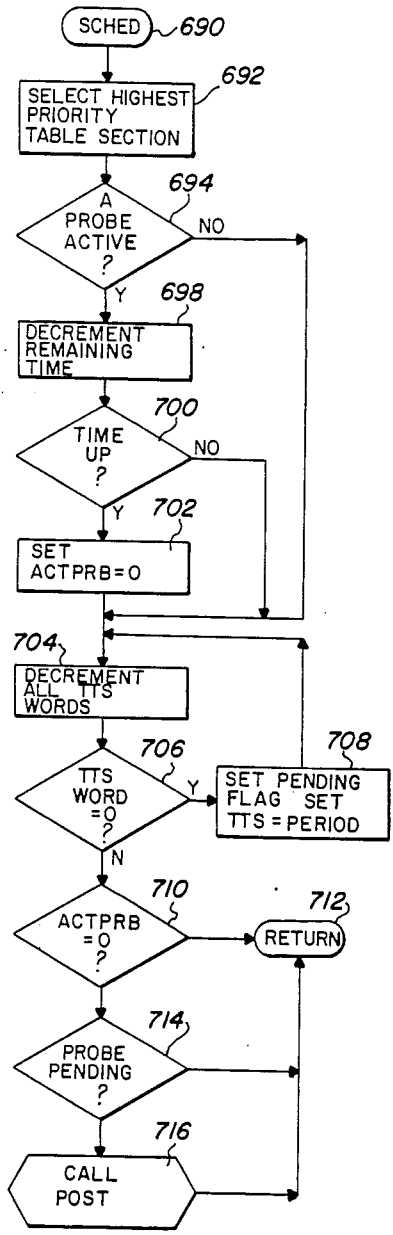

FIG. 22 illustrates a flow diagram of a computer program routine for automatic probe control (APC) for controlling the generation of various ones of the three types of polls. As will be shown, this program enables the polling sequence being transmitted to be varied by adding or subtracting bits in response to responses listed as a result of a probe, in order to introduce new probes gradually to allow line-of-site remote stations to respond independently, or to add or delete extra address bits as noise. Sporatic "E" or auroral reflections are detected by the system. The system thus automatically optimizes the polling sequences being transmitted both before the probes are initiated and during actual transmission of the probes.

Referring to FIG. 22, the APC program is initiated at 630. A decision is made at 632 as whether or not a nominal poll is active. If a normal poll is active, the nominal control table is selected at 634. If a nominal poll is not active, a decision is made at 636 as to whether or not an ad hoc poll is active. If "yes", the ad hoc poll table is selected at 638. If not, a decision is made at 640 as to whether or not a background poll is active. If "yes", a background control table is selected at 642. The control tables for the various nominal, ad hoc and background polls are stored in the computer under operator control and may be varied as desired. If a background poll is not determined to be active at 640, the program exits at 644.

A decision is made if a nominal, ad hoc or background poll is active at 646 to determine what the noise environment is. At 646, a decision is made as to whether any good messages have been received from remote stations in the last 5 seconds. If so, the probe is determined to be good and the program increments to decision point 648. If at least one good reception from a remote station has been received in the last 5 seconds, it will be assumed that either the noise environment is excessively high or the conditions are such that numerous remote stations are attempting to communicate at the same time and therefore none of them are successful in being able to communicate with the master station because they are jamming one another. An accumulator is provided in the digital computer at the master station which counts each time a good message is received. Each 5 seconds it is reset. At 646 the count in the accumulator is detected.

If at least one good reception from a remote station had been detected in the last 5 seconds at 646, a decision is made at 648 to determine whether or not the minimum number of bits exists in the probe address. If "yes", the program increments to B, to be subsequently described. If not, the probe address is incremented at 650.

Normally, if a remote probe is being transmitted, only two probe bits are being transmitted in order that as many remote stations in the field as possible may be polled. Therefore, if extra bits are determined at 648, the program operates to delete extra bits. After the probe address has been incremented at 650, a decision is then made at 652 as to whether or not the address cycle has been accomplished. If so, one bit is deleted from the probe address at 654 and the system cycles to the calculation of new probe words at 656. If the address cycle is not accomplished at 652, the program increments to the calculation of new probe words at 656.

If it is determined at 646 that no good receptions have been received in the last 5 seconds, a decision is made at 658 as to whether or not the maximum number of bad messages stored in the computer is exceeded. Normally, in the preferred embodiment the maximum number is set at ten. If this maximum has not been exceeded, the decision at 648 is next made. If the maximum number of bad messages has been exceeded at 658, a decision is made at 660 as to whether or not the maximum number of bits are in the probe address. If "yes", the system increments to the decision at 648. If not, an additional bit is added to the probe address at 662. The addition of an additional bit further defines the remote stations being probed by the system and tends to improve the signal-to-noise ratio of the probing technique. The loops of adding or subtracting bits are continually reiterated so that the probing address is continually updated and optimized in view of rapidly varying environmental characteristics.

At 656 in FIG. 22, the new probe words determined as a result of the previous addition or subtraction of bits are determined from a table stored in the memory of the computer. A decision is made at 666 as whether or not a new probe word has an excessive number of bits. If so, the program increments back to the decision at 648 in order that the bits may be eliminated. If not, the probe words are posted for the clock interrupt subroutine at 668, and a probe address is obtained from stored tables at 670. The table address is calculated at 672 to which remote stations will reply. This step determines whether or not a remote station exists which will answer the address calculated at 670. A decision is made at 674 as to whether or not there is a requirement to obtain data from the remote station whose station address has been calculated. If so, the program exists at 676. If not, a decision is made at 678 as to whether or not a minimum number of bits are in the probe. If so, the total probe will be ineffective since data has been received from all remote stations identified under that address. Therefore, the probe is deleted at 680 and the next probe is scheduled at 682 and the program exits at 684. If a minimum number of bits are not in the probe at 678, the routine reiterates beginning at the decision point 634.

The schedule (SCHED) sub-routine runs each minute of operation of the system. The schedule sub-routine allows the system to probe certain patterns of remote stations for certain periods of time. For example, in a typical ad hoc poll, the system might probe for one subset of remote stations for eight minutes and then change the probe to address another subset of remote stations for eight minutes. The SCHED sub-routine times out the eight minutes and keeps track of which probes have been running for how long and allows the system to change from one probe to another in a cyclic manner. The system comes on each minute and checks the probes that are scheduled and determines which should be running, and whether or not the one that is currently running is timed out. If the probe has timed out, then the schedule advances to the next probe and when that probe is initiated, the schedule sub-routine calls the post routine, to be subsequently described in FIG. 24, which places the probe in transmission.

The program is initiated at 690 and the highest priority table section is selected at 692. The various probes are provided with different priorities, with nominal polling having a higher priority than ad hoc polling, and ad hoc polling having a higher priority than background polling. Therefore, the system tends to schedule the probe that is highest on the priority list. A decision is made at 694 as to whether or not a probe is presently active. If not, the system increments the loop 696 to steps to be subsequently described. If a probe is active, the remaining time for the probe to run is decremented at 698. A decision is made at 700 as to whether or not the time allotted for the probe is up. If so, the active probe flag is set to zero at 702. If time is not up, the routine advances to the decrementing of all time until schedule (TTS) words at 704. A decision is made at 706 as to whether or not the TTS word has been set to zero. If "yes", the pending flag is set at TTS equals the desired period of operation at 708. If the TTS word is not set to zero, a decision is made at 710 as to whether or not the active probe flag has been set to zero. If not, the system exits to return at 712. If the active probe flag has been set to zero, a decision is made at 714 as to whether or not a new probe is pending. If not, the program routine exits at 712. If "yes", the post program is called at 716.

Figure 24:
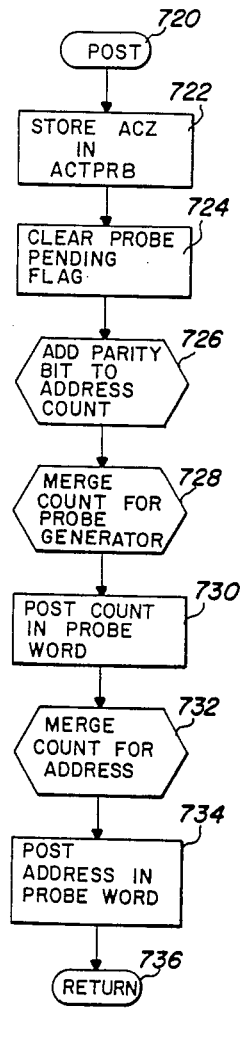
Figure 25:
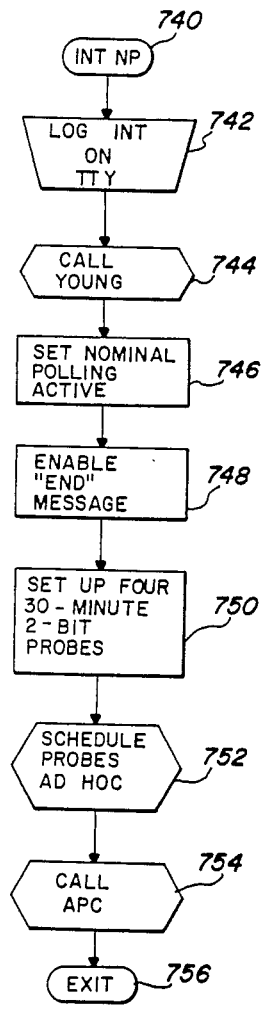

The post program is illustrated at FIG. 24 and serves to determine the highest priority probe which is next to be run and will post the probe for running.

The post program is illustrated in FIG. 24 and initiates at 720. At 722, the active probe word is picked up from the accumulator AC2 and stored in the active probe storage. The probe pending flag is cleared at 724 which was set by the SCHED routine as shown in FIG. 24. In order to generate the actual address and probe bits to be run, the post program then adds a parity bit to the address count at 726 and merges the count for the probe generator at 728.

At 730, the count is posted in the probe word and the count is merged for the address at 732. The address is posted in the probe word at 734 and the program returns at 736. The post routine thus puts up the address bit it desires to be transmitted. The automatic probe conrol (APC) routine shown in FIG. 22 may thus operate upon the address sequence to add or subtract bits in a necessary manner to meet with current signal and noise-to-ratio requirements and the like.

The initiate nominal poll (INTNP) routine sets up the system for nominal polling and scheduling by the schedule program to poll all remote stations associated with a particular master station. The INTNP program is initiated whenever an INT command is received from the central service center 10. Thus, at 642 the INT signal is logged on the teleprinter associated with the computer at the master station. At 744 the Young routine is called which determines any data stored in core which is less than a half-hour old. If such data is available, no additional communication is necessary with the remote stations generating the data. Thus, nominal polling is accomplished from this point on with regard to remote stations which have transmitted data over one-half hour ago.

At 746 the nominal polling is set to be active and an "END" message is enabled at 748. Four thirty minute, two-bit probes are set up at 750 and the probes are scheduled at 752. The APC routine is called at 754 in order to subtract or add bits from the address, as produced by the post routine, and the INTNP routine exits at 756.

Figure 26:
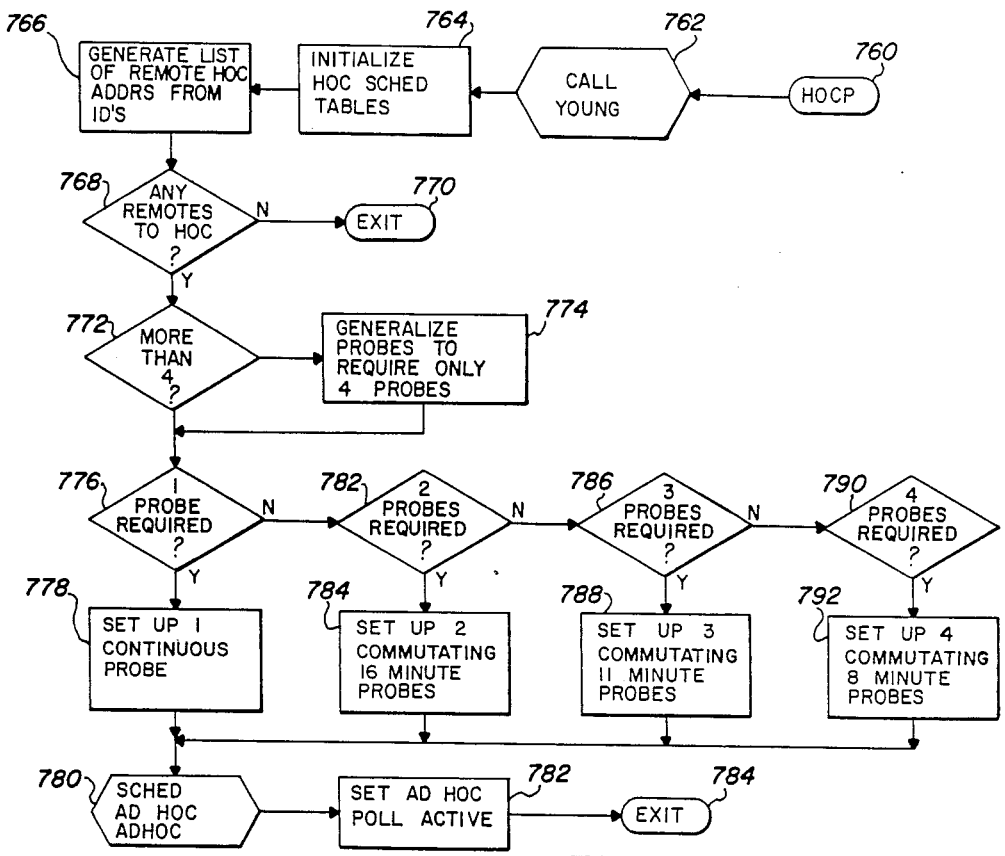

FIG. 26 illustrates the ad hoc processor (HOCP) routine which generates the polling sequence for ad hoc polling. The routine initiates at 760 and causes the Young program 762 to eliminate communication with any remote station which has transmitted a valid response within the last thirty minutes. The ad hoc SCHED tables are initialized at 764 in order to determine the best probes to use to communicate with the remaining remote stations. At 766 a list of remote addresses is generated from the stored ID's in the computer storage. The addresses of the remote stations involved are thus generated at 766.

A decision is made at 768 as to whether or not there are any additional remote stations to communicate with in the ad hoc program. If not, the program exits at 770. If there are remote stations left to be communicated with, a decision is made at 772 as to whether or not there are more than four remote stations to be communicated with. If so, the probes are generalized at 774 to require only four probes in order to enable completion of the ad hoc probing in the necessary half-hour period. The length of the address generated at 774 is dependent upon the number of remote stations to be communicated with as compared with the amount of time available. For example, if only four remote stations are necessary to be addressed, each of the remote stations could be probed for eight minutes a piece. If ten remote stations are to be communicated with, each one could only be individually probed for three minutes. Therefore, at 774, the system compresses the available addresses by a eliminating bits until the stations are grouped wherein they may be probed by only four discete probes in order to allow the necessary time for each probe during a thirty minute period.

If four or fewer remote stations are required to be contacted, a decision is made at 776 as to whether or not only one probe is required. If so, a single continuous probe is set up at 778 and is sent to the schedule at 780. If not, a decision is made at 782 as to whether or not two probes are required. If so, two commutating sixteen minute probes are set up at 784 and are scheduled at 780. If more than two probes are required, a decision is made at 786 as to whether or not three probes are required. If so, three commutating eleven minute probes are set up at 788. If more than three probes are required, a decision is made at 790 as whether or not four probes are required. If so, four commutating eight minute probes are set up at 792. After the probes are scheduled at 780, the ad hoc poll is set active at 782 and the program exits to the schedule at 784.

Figure 27:
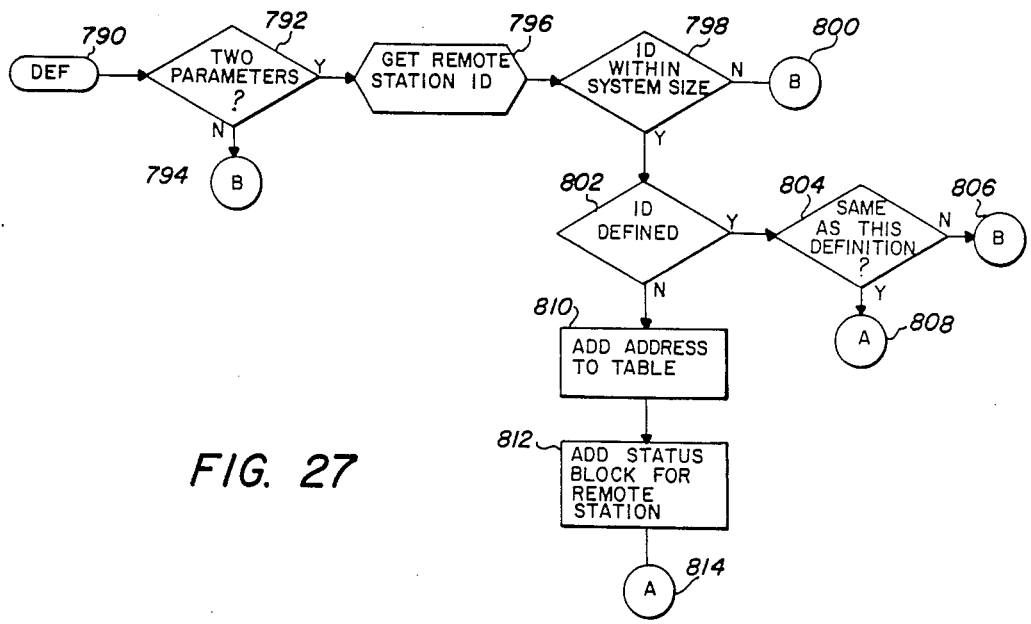

FIG. 27 illustrates a flow diagram of the definition (DEF) routine which determines the addresses of the remote stations in the field to be contacted. The routine initiates at 790 and a decision is made at 792 as to whether or not two parameters have been defined. When the operator defines the routine, the operator types in commands on the teletype associated with the computer. One parameter is the station address, which is the actual address used in the probe to communicate with a particular remote station, and the second paramater is the ID which is used to identify that remote station to the central service center 10. If two parameters have not been input, the routine exits at 794 and an indication is provided calling for the addition of the necessary parameters. If the two parameters are present at 792, the remote station ID is obtained at 796. A decision is made at 798 as to whether or not the ID is within the system size. If not, the program exits at 800 and a command is presented to correctly identify the ID. If the ID size is correct, a decision is made at 802 as to whether or not the ID has been defined. If so, a decision is made at 804 as to whether or not the ID is the same as the stored definition. If not, the routine exits at 806 to allow the correct definition to be input. If "yes", the system increments at 808 to a termination of the program.

If the ID is not defined, the address is added to the stored table at 810. A status block is then added at 812 for the defined remote station and the program exits at 814.

The DEF program determines the addresses of the remote stations. As previously noted, each remote station in the field has a unique address which is trasmitted to the master station when the remote station responds to an appropriate probe. The address transmitted from the remote station determines which probes the station will respond to. This is the address command that defines to the software which remote stations are stored in the system. The stored responses in the software are also equated to an ID which is utilized to identify the remote station in the central service station 10. In the polling technique, when a station is defined that identifies the address of the remote station and provides a status for that remote station.

It may thus been seen that the present system provides a meteor scatter burst communications system which enables a large number of remote stations to be remotely located in generally inaccessible areas and interrogated to automatically transmit data to one or more master stations. The particular polling technique of the system enables any one of any selected group of the remote stations to be selectively polled at any time according to any predetermined schedule. The system enables the simultaneous reception of radio signals reflected from meteor trails from a plurality of remote stations, without undue interference. With the present system, data can be readily obtained regarding meteorological and weather conditions at sites heretofore generally inaccessible for the repeated collection of such data, thereby enabling much more accurate forecasting of environmental conditions. The present polling technique enables remote stations to be selectively polled with automatic compensation for noise and conditions introduced by various factors and enables a continuous standard of signal to noise to be maintained in order to obtain meaningful data in all or in many varying conditions.

The present polling technique is controlled by a programmable digital computer at each master station. While it would be understood that various programmable digital computers or hardwired digital systems may be utilized to perform the described functions of the invention, in the preferred embodiment a Nova Three Minicomputer manufactured and sold by Data General Company has been utilized. The computer has been programmed with Data General computer language and a program listing for performing the previously described routines relating to remote station polling is attached herewith as Table I.

TABLE I

```
                                      SCHED
00351'054527 SCHED:   STA    0,CHSV
00352'020122-         LDA    0,CHFLG   ;MODE 2 ?
00353'101014          SZ     0,0
00354'002524          JMP    @SCHSV    ;YES DON'T SCHED ANYONE
00355'030163-         LDA    2,ANOMT   ;SCHEDULE FROM ACTIVE TABLE
00356'025000          LDA    1,PSTAT,2 ;N:0=0, NOM HAS PRIORITY
00357'127057          SGZ    1,1
00360'050164-         LDA    2,AHOCT   ;IDENTIFY ACTIVE PROBE TABLE
00361'025000          LDA    1,PSTAT,2
00362'127057          SGZ    1,1
00363'030165-         LDA    2,ARKTB
00364'025000          LDA    1,PSTAT,2
00365'127057          SGZ    1,1
00366'002512          JMP    @SCHSV    ;EXIT IF NO ONE ACTIVE
00367'024166-         LDA    1,ACTPT   ;RESET POSITION IF NEW TABLE
00370'050166-         STA    2,ACTPT
00371'102400          ZERO   0,0
00372'132414          SEQ    1,2
00373'040113-         STA    0,ACTPRB
00374'021010          LDA    0,SCHTB,2
00375'050110-         STA    0,APRGLK
00376'030113-         LDA    2,ACTPRB
00377'151015          SKPNZ  2,2
00400'000410          JMP    SCH1
00401'021002          LDA    0,2,2     ;SCHEDULE STILL GOOD ?
00402'101015          SNZ    0,0
00403'000404          JMP    SCH1-1
00404'102400          ZERO   0,0
00405'015005          DSZ    5,2       ;DEC TIME ON
00406'000402          JMP    SCH1
00407'040113-         STA    0,ACTPRB
00410'020107-SCH1:    LDA    0,NUMPRB  ;DEC ALL ACTIVE TIME TIL SCH WDS
00411'040114-         STA    0,LOOPCT
00412'030110-         LDA    2,APRBLK
00413'024111-         LDA    1,PBLKSZ
00414'021002 SCH2:    LDA    0,2,2     ;ONLY IF PERIOD NOT 0
```

```
00415'101015        SKPNZ   0,0
00416'000406        JMP     SCH5
00417'015003        DSZ     3,2       ;DECR TTS
00420'000404        JMP     SCH3
00421'021002        LDA     0,2,2     ;SCHED IT
00422'041003        STA     0,3,2     ;RESET TIME
00423'041006        STA     0,6,2     ;SET PENDING FLAG
00424'133000 SCH3:  ADD     1,2       ;LOOP CONTROL
00425'014114-       DSZ     LOOPCT
00426'000766        JMP     SCH2
00427'030113-       LDA     2,ACTPRB
00430'151014        SZ      2,2
00431'002447        JMP     @SCHSV    ;RETURN IF ACTIVE
00432'102000        MONE    0,0
00433'034110-       LDA     3,APRBLK              ;GET BLOCK LIMIT
00434'117000        ADD     0,3                   ;DECREMENT
00435'035400        LDA     3,0,3
00436'020107-SCH4:  LDA     0,NUMPRB              ;PROBE PENDING?
)11 SNOTE
00437'101400        INC     0,0        ;INCREMENT SO WE CAN DECREMENT IT
00440'040114-       STA     0,LOOPCT
00441'030166-       LDA     2,ACTPT
00442'031011        LDA     2,ACTPOS,2    ;COMMUTATE THE SCHEDULER
00443'151015        SNZ     2,2
00444'030110-       LDA     2,APRBLK
00445'024111-       LDA     1,PBLKSZ
00446'102400        ZERO    0,0
00447'040433        STA     0,SCHMT
00450'000410        JMP     SCH5A      ;PRE-ADVANCE COMMUTATOR
00451'021002 SCH5:  LDA     0,2,2      ;ACTIVE BLOCK?
00452'101015        SKPNZ   0,0
00453'000405        JMP     SCH5A
00454'040426        STA     0,SCHMT    ;FLAG THAT A SCHED EXITS
00455'021006        LDA     0,6,2      ;GET PENDING FLAG
00456'101014        SZ      0,0
00457'000415        JMP     SCH6
00460'133000 SCH5A: ADD     1,2
00461'156033        SLT     2,3                   ;LIMIT CHECK TABLE
00462'030110-       LDA     2,APRBLK
00463'014114-       DSZ     LOOPCT
00464'000765        JMP     SCH5
00465'006416        JSR     @APRBOF
00466'020414        LDA     0,SCHMT               ;KILL PROBE IF EMPTY
00467'101014        SZ      0,0
00470'002410        JMP     @SCHSV
00471'030166-       LDA     2,ACTPT
00472'041000        STA     0,PSTAT,2
00473'002405        JMP     @SCHSV
00474'034166-SCH6:  LDA     3,ACTPT
00475'051411        STA     2,ACTPOS,3
00476'004407        JSR     POST
00477'002401        JMP     @SCHSV
00500'000000 SCHSV: 0
00501'000000 SCHS2: 0
00502'000000 SCHMT: 0       ;SCHEDULER EMPTY
00503'000744'APRBOF: PRBOF
            ;POST THE NEXT SCHEDULE PROBE
                                              POST
00505'054777 POST:  STA     3,-1
00506'050113-       STA     2,ACTPRB      ;PROBE IN AC2
00507'102400        ZERO    0,0
00510'025004        LDA     1,4,2      ;INITIALIZE DURATION
00511'045005        STA     1,5,2
00512'041006        STA     0,6,2
00513'025000        LDA     1,0,2      ;GET ADDR COUNT
00514'034166-       LDA     3,ACTPTB
00515'045406        STA     1,MNPRB,3
00516'125222        MOVZR   1,1,SZC    ;GEN PARITY
00517'100000        COM     0,0
00520'125014        SZ      1,1
00521'000775        JMP     .-3
00522'024063-       LDA     1,DT11     ;PARITY BIT
00523'035000        LDA     3,0,2      ;GET ADDR COUNT BACK
00524'101015        SKPNZ   0,0        ;ODD?
00525'137000        ADD     1,3        ;YES
00526'020043-       LDA     0,DSOK
00527'163000        ADD     3,0
00530'040161-       STA     0,NXTPC
00531'025001        LDA     1,1,2      ;GET ADDR

012 SNOTE
00532'175305        MOVS    3,3,SNR
00533'000405        JMP     PDONE      ;SKIP IF 0 BITS
00534'177120        ADDZL   3,3        ;SHIFT 2
00535'177120        ADDZL   3,3
```

```
00536'167000           ADD      3,1
00537'000402           JMP      .+2         ;SKIP
00540'126400  PDONE:   ZERO     1,1
00541'034166-          LDA      3,ACTPTB
00542'044162-          STA      1,NXTPC+1
00543'020041-          LDA      0,B1777
00544'107400           AND      0,1
00545'045407           STA      1,PBASE,3       ;STORE BASE ADDRESS FOR APC
00546'024103-          LDA      1,PBON      ;PROBE ON?
00547'125015           SKPNZ    1,1
00550'004562          JSR      PRBON       ;NO, TURN IT ON
00551'030166-          LDA      2,ACTPTB
00552'102400           ZERO     0,0
00553'024065-          LDA      1,BT13
00554'045003           STA      1,LEVEL,2       ;CLEAR PROBE TABLE - SET UP LOS
00555'041012           STA      0,EXTBT,2
00556'041013           STA      0,EXTBT+1,2
00557'041014           STA      0,EXTBT+2,2
00560'041015           STA      0,EXTBT+3,2
00561'002723           JMP      @POST-1                 PBINT
00762'020071- PBINT:   LDA      0,PMODE     ;CHECK MODE
00763'030474           LDA      2,PDADR
00764'125125           MOVZL    0,1,SNR     ;MULT 2
00765'001400           RETURN
00766'133000           ADD      1,2
00767'027000  PCTR:    LDA      1,CO,2      ;GET DATA WORD
00770'125004           MOV      1,1,SZR     ;ZERO?
00771'000411           JMP      PCTR1       ;NO
00772'023001           LDA      1,1,2       ;YES RESET POINTER
00773'045000           STA      1,0,2
00774'024065-          LDA      1,BT13
00775'122414           SEQ      1,0         ;MODE 4? (ACK)
00776'000771           JMP      PCTR        ;NO
00777'102520           SUBZL    0,0         ;YES, SET TO MODE ONE
01000'040071-          STA      0,PMODE
01001'000761           JMP      PBINT
01002'045040  PCTR1:   DOA      1,TXCH
01003'011000           ISZ      0,2
01004'002040           RETURN

050000            ADRCST=50000
              050000            ADRB=50000
              127777            TONES=127777    ;12 ONES CAUSES PROBE SYNC

DIS $NOTE
              100022            SYNC=100022
              000100            MD1=100
              000200            MD2=200
              100334            ACKP=100334
              100000            CMD=100000
01000'127777  M1PRB:   TONES    ;MODE1 DATA PROBE
01001'100122           SYNC+MD1
01002'050000           ADRCST
01003'050000           ADRB
01004'000000           0
01005'127777  M2PRB:   TONES    ;MODE 2 COMMAND PROBE
01006'100222           SYNC+MD2
01007'050032           ADRCST+32
01010'050000           ADRB
01011'100000           CMD
01012'100000           CMD
01013'000000           0
01014'061777  M3PRB:   61777       ;ALL ONES PROBE
01015'000000           0
01016'127777  M4PRB:   TONES       ;MODE 4 ACKNOWLEDGE
01017'127777           TONES
01020'127777           TONES       ;THIRTY ONES
01021'100334           ACKP
01022'050010           ADRCST+10               ;8 BITS
01023'000000  M4PRA:   0
01024'000000           0
01025'127777  M5PRB:   TONES       ;PCU MESSAGE
01026'100222           SYNC+MD2
01027'050002           50002       ;TWO BITS
01030'030007           30007       ;MAKE THEM ONES, PLUS MARKER BIT
01031'070101           70101       ;ABCDEF0123456789
01032'070002           70002       ;USART NEEDS WRONG PARITY ON FIRST CHARACTER
01033'070103           70103
01034'070004           70004
01035'070105           70105
01036'070106           70106
01037'070160           70160
01040'070061           70061
01041'070062           70062
01042'070163           70163
01043'070064           70064
01044'070165           70165
```

```
01045'070166           70166
01046'070067           70067
01047'070070           70070
01050'070171           70171
01051'000000           0
01052'001052'PBADR:    PBADR
01053'000000           0
01054'001000'          M1PRB
01055'001000'          M1PRB
01056'001005'          M2PRB
01057'001005'          M2PRB
01060'001014'          M3PRB
01061'001014'          M3PRB
01062'001016'          M4PRB
01063'001016'          M4PRB
01064'001025'          M5PRB
01065'001025'          M5PRB
```

INTNP

```
02630'030163-INTNP:  LDA    2,ANOMT
02631'102400         ZERO   0,0
02632'040145-        STA    0,INTFG
02633'102520         ONE    0,0
02634'040141-        STA    0,NENDF  ;NOMINAL END FLAG - ENABLES END MESSAGE
02635'041000         STA    0,PSTAT,2
              ;SET NOMINAL POLL BIT FOR ALL DEFINED REMOTES AND CLEAR GOT BIT
02636'034151-        LDA    3,AIDTB
02637'020130-        LDA    0,SYSSZ  ;SET UP TO SEARCH IDTB
02640'040501         STA    0,INTCT
02641'031400 INTNA:  LDA    2,0,3
02642'151015         SNZ    2,2
02643'000407         JMP    INTNB    ;REMOTE NOT DEFINED
02644'027400         LDA    1,C0,3   ;SET BIT
02645'020475         LDA    0,INTMK
02646'107400         AND    0,1
02647'020052-        LDA    0,BT2              30
02650'107000         ADD    0,1
02651'047400         STA    1,C0,3   ;PUT STATUS BACK
02652'175400 INTNB:  INC    3,3
02653'014464         DSZ    INTCT
02654'000765         JMP    INTNA
02655'006070-INTN1:  JSR    @APDON   ;MAKE SURE PROBE IS ON
02656'030163-        LDA    2,ANOMT  ;INITIALIZE NOMINAL POLLING
02657'025010         LDA    1,SCHTB,2
02660'044110-        STA    1,APRBLK           ;SWITCH SCHEDULER
02661'006075-        JSR    CARSTP             ;RESET ANY PROBE IN PROGRESS
02662'020154-        LDA    0,MSID
02663'040440         STA    0,MSIDA
02664'030442 INTN3:  LDA    2,PSCHA            ;SCHEDULE ADDRESS
02665'101120         MOVZL  0,0
02666'041001         STA    0,1,2
02667'006451         JSR    @APSAD             ;GO SCHEDULE
02670'101000         NOP
02671'030442         LDA    2,PSCHB
02672'020431         LDA    0,MSIDA
02673'101140         MOVOL  0,0
02674'041001         STA    0,1,2              ;GROUP B
02675'006443         JSR    @APSAD
02676'101000         NOP
02677'102520         ONE    0,0                ;IDENTIFY OTHER MASTER
02700'024154-        LDA    1,MSID
02701'125014         SZ     1,1
02702'102400         ZERO   0,0
02703'024420         LDA    1,MSIDA
02704'040417         STA    0,MSIDA
02705'106415         SNE    0,1                ;SECOND PASS ?
02706'000404         JMP    .+4                ;YES
02707'024171-        LDA    1,ALL              ;MUST WE DO ALL REMOTES ?
02710'125014         SZ     1,1
02711'000753         JMP    INTN3              ;YES - SET UP FOR BOTH MASTER PROBES
02712'030163-        LDA    2,ANOMT
02713'102520         ONE    0,0

;; SNOTE
02714'041000         STA    0,PSTAT,2          ;SET NOMINAL ACTIVE
02715'006410         JSR    @AYNG              ;DUMP DATA THAT'S READY
02716'102400 INTN2:  ZERO   0,0
02717'040156-        STA    0,GCNTS
02720'040160-        STA    0,DCNTS
02721'006403         JSR    @AISCH             ;RUN THE SCHEDULER
02722'000422         JMP    APC
02723'000000 MSIDA:  0                         ;ACTIVE MASTER ID
02724'000331'AISCH:  SCHED
02725'004636'AYNG:   YOUNG
```

APC

```
02724'030163-APC:   LDA    2, ANORM       ;GET NORM STATUS
02725'021000        LDA    0, PSTAT, 2
02726'103056        SNEGZ  0, 0
02727'000411        JMP    APC1           ;NORM ACTIVE
02730'030164-       LDA    2, AHOCT
02731'021000        LDA    0, PSTAT, 2
02732'103056        SNEGZ  0, 0
02733'000405        JMP    APC1
02734'030165-       LDA    2, ABKTB
02735'021000        LDA    0, PSTAT, 2
02736'103057        SGZ    0, 0
02737'002006$       JMP    @AMASTR        ;NO ACTIVE PROBE
02740'050116-APC1:  STA    2, ACTAP
02741'020156-       LDA    0, GCNTS       ;ANY GOOD MSG LAST 5 SEC ?
02742'101014        SZ     0, 0
02743'000567        JMP    APCA           ;GOOD MSG
02744'020160-       LDA    0, BCNTS       ;NO GOOD MESSAGES
02745'024756        LDA    1, BLMT        ;MANY BAD MESSAGES ?
02746'106432        SGT    0, 1
02747'000563        JMP    APCA           ;NO
02750'021003        LDA    0, LEVEL, 2    ;TOO MANY BAD - ADD A BIT
02751'025006        LDA    1, MNPRB, 2
02752'123000        ADD    1, 0
02753'025004        LDA    1, MXLEV, 2
02754'106033        SLT    0, 1
02755'000555        JMP    APCA           ;MAX NUMBER OF BITS IN PROBE ALREADY
02756'011003        ISZ    LEVEL, 2       ;INCREASE LEVEL
02757'175400        INC    3, 3
02760'157000        ADD    2, 3           ;GET TABLE DISPLACEMENT
02761'102400        ZERO   0, 0
02762'041012        STA    0, EXTBT, 2    ;ZERO STARTING LEVEL
154 SNOTE
02763'021006 APCC:  LDA    0, MNPRB, 2    ;CALCULATE NEW PROBE WORDS
02764'025003        LDA    1, LEVEL, 2
02765'107000        ADD    0, 1           ;NUMBER OF BITS
02766'035004        LDA    3, MXLEV, 2
02767'136433        SLE    1, 3
02770'000542        JMP    APCA           ;TOO MANY BITS - REDUCE LEVEL
02771'045005        STA    1, TLPRB, 2
02772'175000        MONE   3, 3           ;PUT PARITY ON COUNT
02773'121020        MOVZ   1, 0
02774'101202        MOVR   0, 0, SZC
02775'174020        COMZ   3, 3
02776'101014        SZ     0, 0
02777'000775        JMP    .-3            ;ADD PARITY BIT IF AC3 NEG
03000'020063-       LDA    0, BT11
03001'175014        SZ     3, 3
03002'107000        ADD    0, 1
03003'020551        LDA    0, C50K        ;ADD BIT COUNT
03004'107000        ADD    0, 1
03005'045001        STA    1, PRACT, 2    ;STORE COUNT WORD
03006'025003        LDA    1, LEVEL, 2    ;GET ADDRESS TO PROBE
03007'135000        MOV    1, 3
03010'124400        NEG    1, 1           ;SHIFT BASE OVER FOR EXTRA BITS
03011'021007        LDA    0, PBASE, 2
03012'125015        SNZ    1, 1
03013'000404        JMP    .+4
03014'101120        MOVZL  0, 0
03015'125400        INC    1, 1
03016'000774        JMP    .-4            ;MERGE IN EXTRA BITS
03017'157000        ADD    2, 3
03020'025412        LDA    1, EXTBT, 3
03021'107000        ADD    0, 1
03022'021005        LDA    0, TLPRB, 2    ;GET NUMBER OF BITS TO SEND
03023'103120        ADDZL  0, 0           ;MOVE TO LEFT 4 BITS
03024'103120        ADDZL  0, 0
03025'101300        MOVS   0, 0
03026'107000        ADD    0, 1
03027'045002        STA    1, PRADR, 2    ;PROBE ADDR WORD
03030'044162-       STA    1, NXTPC+1
03031'025001        LDA    1, PRACT, 2    ;POST FOR 5 SEC ROUTINE
03032'044161-       STA    1, NXTPC       ;WATCH DOG - CHECK IF ANYONE WILL ANSWER PROBE
03033'035005 WDOG:  LDA    3, TLPRB, 2    ;DETERMINE WHAT PART OF ADDR TBL TO SEARCH
03034'054022        STA    3, INDX3
03035'024044-       LDA    1, B12         ;SET UP SHIFTS
03036'166400        SUB    3, 1
03037'044023        STA    1, INDX4
03040'025002        LDA    1, PRADR, 2
03041'020042-       LDA    0, B7777
03042'107400        AND    0, 1
03043'020055-       LDA    0, BT5
03044'175015        SNZ    3, 3
03045'000412        JMP    WDOGA
03046'101220        MOVZR  0, 0           ;DECREASE COUNT
03047'014022        DSZ    INDX3
```

```
03050'000776           JMP     .-2
03051'034023           LDA     3,INDX4
03052'175015           SNZ     3,3
03053'000404           JMP     WDOGA
03054'125120           MOVZL   1,1
03055'014023           DSZ     INDX4
```

```
03057'030152 WDOGA:   LDA     2,ARADT
03060'113000          ADD     1,2              ;START SEARCH HERE - GO FOR COUNT IN 0
03061'050022          STA     2,INDX3
03062'014022          DSZ     INDX3            ;ADDR
03063'045023          STA     INDX4            ;COUNT
03064'030022 WDOGB:   LDA     2,INDX3          ;GET FIRST ADDRESS
03065'101112          MOV?    0,0
03066'000122          JMP     WDOGC            ;ADDRESS NOT DEFINED
03067'030151          LDA     2,AIDTB
03070'113000          ADD     0,2              ;GET ID ENTRY
03071'021000          LDA     0,0,2
03072'101015          SNZ     0,0
03073'000415          JMP     WDOGC            ;REMOTE NOT ADDED
03074'021300          LDA     0,CO,2           ;GET STATUS WORD
03075'101112          MOV?    0,0
03076'000112          JMP     WDOGC            ;REMOTE DOWN
03077'024056          LDA     1,DSOK
03100'107003          AND     0,1,SNR          ;DATA REQUIRED ?
03101'000007          JMP     WDOGC
03102'024171          LDA     1,ALL
03103'125014          SZ      1,1              ; NEED THIS REMOTE FOR EITHER MASTER ?
03104'000065          JMP     CAMSTR           ;YES -- LEAVE PROBE UP
03105'024051          LDA     1,BT1            ;NO - ONLY IF FOR THIS MASTER
03106'107404          AND     0,1,SZR
03107'020065          JMP     CAMSTR           ;IT'S FOR US
03110'014023 WDOGC:   DSZ     INDX4            ;TRY ANOTHER
03111'000703          JMP     WDOGB
03112'030116          LDA     2,ACTAB          ;NOBODY FOR THIS PROBE
03113'025003          LDA     1,LEVEL,2
03114'125014          SZ      1,1
03115'000607          JMP     APC              ;NO - GO TRY NEXT PROBE
03116'034165          LDA     3,ABKTB          ;DON'T CANCEL BACKGROUND
03117'151415          SNE     2,3
03120'020065          JMP     CAMSTR
03121'021006          LDA     0,INPRG,2        ;MAX LEVEL - DELETE THIS PROBE
03122'040433          STA     0,CANTB+1
03123'021007          LDA     0,PHASE,2
03124'040434          STA     0,CANTB+2
03125'030431          LDA     2,CANTB
03126'006433          JSR     CACAN1
03127'020065          JMP     CAMSTR
03130'007076          JSR     CASCHD
03131'000000          JMP     APC
03132'021003 APCA:    LDA     0,LEVEL,2        ;PROBE OK - ADVANCE SEQUENCE
03133'101015          SNZ     0,0
03134'000677          JMP     WDOG             ;ALREADY MIN PROBE
03135'113000          MOV     0,3
03136'157000          ADD     2,3
03137'025412          LDA     1,EXTBT,3        ;GET BITS
03140'125400          INC     1,1
03141'045412          STA     1,EXTBT,3
03142'100400          NEG     0,0              ;FIELD DONE ?
03143'125220          MOVZR   1,1
03144'101404          INC     0,0,SZR
03145'000776          JMP     .-2
03146'125015          SNZ     1,1              ;IF AC1 NOT ZERO, THEN FIELD OVERFLOWED
03147'000614          JMP     APCC
03150'041412          STA     0,EXTBT,3        ;ADVANCE TO NEXT FIELD - ONE LESS BIT
03151'015003          DSZ     LEVEL,2
03152'000611          JMP     APCC
```

```
03153'000610          JMP     APCC
03154'050000 DSOK:    50000
03155'030000 BSOK:    30000
03156'003157 CANTB:   .+1
03157'000000          0
03160'000000          0
03161'000604 ACAN1:   CANAH
03162'000000 MOMTB:   0
03163'050026          50026
03164'060000          60000
03165'000004          4
03166'000010          10
03167'000002          2
03170'000002          2
03171'000000          0
03172'047737 PROBLK:
```

```
03173'004737'    PRBBLK
03174'000000     0
03175'000000     0
03176'000000     0
03177'000000     0
03200'000000     0
03201'000000     0
03202'050000 HOCTB: 0
03203'050026     50026
03204'060000     60000
03205'000004     4
03206'000010     10
03207'000002     2
03210'000002     2
03211'000000     0
03212'004774'    HPRBCK
03213'004774'    HPRBCK
03214'000000     0
03215'000000     0
03216'000000     0
03217'000000     0
03220'000000     0
03221'000000     0
03222'000000 DKTB: 0
03223'050026     50026
03224'060000     60000
03225'000004     4
03226'000012     12
03227'000002     2
03230'000002     2
03231'000000     0
03232'005031'    DPRBLK
03233'005031'    DPRBLK
03234'000000     0
03235'000000     0
03236'000000     0
03237'000000     0
03240'000000     0
03241'000000     0
03242'030163-TRM:  LDA   2,ANOMT       ;SUSPEND NOMINAL POLLING
03243'021000       LDA   0,PSTAT,2
03244'103057       SGZ   0,0
03245'020335       JMP   @AHRET        ;EXIT IF NOT NOMINAL
03246'102000       MONE  0,0

; CHOTE
03247'041000       STA   0,PSTAT,2     ;SUSPEND
03250'030164-      LDA   2,AHOCT       ;TURN OFF PROCS IF NOT HOC
03251'021000       LDA   0,PSTAT,2
03252'103057       SGZ   0,0
03253'006411       JSR   CAPBOF
03254'020335       JMP   @AHRET
03255'030164-HLTP: LDA   2,AHOCT       ;SUSPEND HOC AND NOM
03256'021000       LDA   0,PSTAT,2
03257'103057       SGZ   0,0
03260'000762       JMP   TRM
03261'102000       MONE  0,0
03262'041000       STA   0,PSTAT,2
03263'000757       JMP   TRM
03264'000744'APSUF: PRBOF
03265'030164-RSM:  LDA   2,AHOCT       ;RESUME SUSPENDED HOC
03266'021000       LDA   0,PSTAT,2
03267'126520       ONE   1,1
03270'101112       SPOS  0,0
03271'045000       STA   1,PSTAT,2     ;RESUME SUSPENDED NOMINAL
03272'030163-      LDA   2,ANOMT
03273'021000       LDA   0,PSTAT,2
03274'101112       SPOS  0,0
03275'045000       STA   1,PSTAT,2
03276'006070-      JSR   CAPDON
03277'020335       JMP   @AHRET
; TABLE TO HOLD UP TO 20 ADDRESSES TO AD HOC
                                    HOCP 18 03300'004636'       YOUNG
19 03301'006777 HOCP:  JSR   YOUNG-1       ;GET DATA THAT'S YOUNG ENOUGH
20 03302'030525        LDA   2,AHADT       ;INIT TABLE TO -1
21 03303'024523        LDA   1,THTS
22 03304'044520        STA   1,HADLP
23 03305'102000        MONE  0,0
24 03306'041000        STA   0,0,2
25 03307'151400        INC   2,2
26 03310'014514        DSZ   HADLP
27 03311'000775        JMP   .-3
28             ;NOW MUST RUN IDTB TO FIND HOC REQUIREMENTS,
29             ;  THEN CALL IDADR TO GET ADDRESS
30 03312'024130-       LDA   1,SYSSZ       ;INITIALIZE ID PASS
```

```
11 03313'044023             STA      1,INDX4
12 03314'024151-            LDA      1,AIDTB
13 03315'044022             STA      1,INDX3
14 03316'014022             DSZ      INDX3
15 03317'102400             ZERO     0,0
16 03320'040167-            STA      0,HOCFG
17 03321'040172-            STA      0,HADCT       ;INIT HOC TABLE PASS
18 03322'020303             LDA      0,HTS
19 03323'040501             STA      0,HADLP
20 03324'024303             LDA      1,AHADT
21 03325'044024             STA      1,INDX5
22 03326'014024             DSZ      INDX5
23 03327'107000             ADD      0,1
24 03330'044025             STA      1,INDX6       ;PARALLEL TABLE
25 03331'014025             DSZ      INDX6
26 03332'036022 HADL1:      LDA      3,@INDX3      ;GET A STATUS WORD
27 03333'175113             SNEG     3,3
28 03334'000403             JMP      .+3
29 03335'035400             LDA      3,0,3
30 03336'000775             JMP      .-3
   ;SNOTE
   03337'021400             LDA      0,0,3
   03340'024053-            LDA      1,BT3
   03341'101113             SNEG     0,0           ;HOC ?
   03342'107405             AND      0,1,SNR       ;DOWN ?
   03343'000445             JMP      HNXT
   03344'024171-            LDA      1,ALL         ;MUST BE THIS MASTER, UNLESS ALL
   03345'125014             SZ       1,1
   03346'000404             JMP      .+4           ;ALL ?
   03347'024051-            LDA      1,BT1         ;THIS MASTER ?
   03350'107405             AND      0,1,SNR
   03351'000437             JMP      HNXT
   03352'030170-            LDA      2,HHRFG       ;ONLY 1 ERROR COUNT PER HOUR
   03353'151015             SNZ      2,2
   03354'000415             JMP      HADL2
   03355'030446             LDA      2,ERMK1
   03356'165000             MOV      0,1           ;INCR ERROR FIELD TO COVER NO-RESPONDS
   03357'147400             AND      2,1
   03360'132415             SNE      1,2
   03361'000410             JMP      HADL2
   03362'024060-            LDA      1,BT8
   03363'123000             ADD      1,0
   03364'041400             STA      0,0,3         ;PUT BACK STATUS WORD
   03365'143400             AND      2,0
   03366'126000             MOVE     1,1
   03367'142415             SNE      2,0
   03370'044135-            STA      1,NEGFG       ;MAX COUNT
   03371'030151-HADL2:      LDA      2,AIDTB       ;HOC IT - WHICH ONE IS IT
   03372'024022             LDA      1,INDX3
   03373'146400             SUB      2,1
   03374'006426             JSR      @AIDA1        ;ID SENT IN AC1, ADDR RETURNED IN AC0
   03375'101415             INC#     0,0,SNR       ;CONTINUE IF UNDEFINED
   03376'000412             JMP      HNXT
   03377'101220             MOVZR    0,0           ;MAX OF 7 ADDR BITS, PLEASE
   03400'101220             MOVZR    0,0
   03401'101220             MOVZR    0,0
   03402'042024             STA      0,@INDX5      ;PUT ADDR IN HOC TABLE
   03403'042025             STA      0,@INDX6      ;PARALLEL TABLE
   03404'010172-            ISZ      HADCT
   03405'014417             DSZ      HADLP         ;HOC TABLE FULL ?
   03406'000402             JMP      HNXT          ;NO
   03407'000403             JMP      HNXT1
   03410'014023 HNXT:       DSZ      INDX4         ;END OF ID TABLE ?
   03411'000721             JMP      HADL1         ;NO
   03412'020027-HNXT1:      LDA      0,B7
   03413'040173-            STA      0,HOCBT
   03414'102400             ZERO     0,0
   03415'040170-            STA      0,HHRFG
   03416'020172-            LDA      0,HADCT       ;EXIT IF NOBODY LEFT
   03417'101015             SNZ      0,0
   03420'002006+            JMP      @AMASTR
   03421'000524             JMP      HCOMH
   03422'004364'AIDA1:      IDADR
   03423'001600 ERMK1:      1600
   03424'000024 HADLP:      HTSIZ                  ;LOOP COUNTER
   03425'000024 HTS:        HTSIZ
   03426'000074 THTS:       HTSIZ*3
   03427'003430'AHADT:      .+1
   03430'0(.074 HADTB:      .BLK     HTSIZ*3
   03524'177777             -1                     ;EOT MARKER
   03525'024065-HCOMP:      LDA      1,BT13        ;HOC COMPRESSION ALGORITHM - NO MORE THAN 4 ENTRIES WHEN 1
   ;SNOTE
11 03526'020172-            LDA      0,HADCT
12 03527'104432             SGT      0,1
13 03530'000447             JMP      HSCH          ;GO SCHEDULE IT
14 03531'014173-            DSZ      HOCBT         ;COMPRESS 1 BIT
15 03532'030673             LDA      2,AHADT
16 03533'020672             LDA      0,HTS
```

```
07 03534'113000            ADD    0,2              ;COMPRESS SECOND TABLE
13 03535'040022            STA    0,INDX3
12 03536'021000            LDA    0,0,2
10 03537'101414            SMOVE  0,0
11 03540'101220            MOVZR  0,0              ;RIGHT SHIFT ALL ENTRIES
12 03541'041000            STA    0,0,2
13 03542'151400            INC    2,2
14 03543'014022            DSZ    INDX3
15 03544'000772            JMP    .-6
16 03545'020660  HCOMH:    LDA    0,HTS            ;ELIMINATE COMMON ADDRESSES
17 03546'030661            LDA    2,AHADT
   03547'040022            STA    0,INDX3
   03550'020022  HCOMA:    LDA    0,INDX3
   03551'040023            STA    0,INDX4
   03552'153000            MOV    2,3
   03553'021024            LDA    0,HTSIZ,2
   03554'101112            SPOS   0,0
   03555'000416            JMP    HCOMC
   03556'025425  HCOMB:    LDA    1,HTSIZ+1,3
   03557'106414            SEQ    0,1
   03560'000410            JMP    HCOMG
   03561'045000            STA    1,0,2            ;THROW ONE OUT, SAVE COMPRESSED ADDRESS
   03562'024173-           LDA    1,HOCBT          ;AND COUNT
   03563'045050            STA    1,2*HTSIZ,2
   03564'014172-           DSZ    HADCT
   03565'126000            MONE   1,1
   03566'045401            STA    1,1,3
   03567'045425            STA    1,HTSIZ+1,3
   03570'173400  HCOMG:    INC    3,3
   03571'014023            DSZ    INDX4
   03572'000764            JMP    HCOMB
   03573'151400  HCOMC:    INC    2,2
   03574'014022            DSZ    INDX3
   03575'000753            JMP    HCOMA
   03576'000727            JMP    HCOMP
            ;SCHEDULE HOCS - HOCBT HAS # OF BITS TO SCHEDULE
            ;              HADCT HAS # OF ADDRESSES TO PROBE
            ;              HTIMT HAS HOC TIME IN MINUTES (MAX 4 PROBES)
   03577'030164- HSCH:     LDA    2,AHOCT
   03600'025010            LDA    1,SCHTB,2        ;SET TABLE POINTER
   03601'102520            ONE    0,0
   03602'041000            STA    0,PSTAT,2
   03603'044110-           STA    1,APRILK
   03604'006075-           JSR    @ARSTP           ;RESET CURRENT HOC SCHEDULE
   03605'030447            LDA    2,HTIMT
   03606'024172-           LDA    1,HADCT
   03607'125013            SNZ    1,1
   03610'006052            PQUES                   ;ZERO ADDRESS TO PROBE
   03611'020065-           LDA    0,BT13
   03612'122433            SLE    1,0
   03613'006052            PQUES                   ;TOO MANY ENTRIES
   03614'133000            ADD    1,2
   03615'021000            LDA    0,0,2
   03616'030443            LDA    2,HSCHT-1
040 SNOTE
   03617'041003            STA    0,3,2
   03620'034607            LDA    3,AHADT          ;SEARCH FOR ADDR
   03621'021400            LDA    0,0,3
   03622'101414            SMOVE  0,0
   03623'000403            JMP    HCOME
   03624'173400  HCOMD:    INC    3,3
   03625'000774            JMP    .-4
   03626'041001  HCOME:    STA    0,1,2            ;GOT ADDR
   03627'021450            LDA    0,2*HTSIZ,3      ;GET BIT COUNT
   03630'103057            SGZ    0,0
   03631'020027-           LDA    0,B7             ;DEFAULT TO 7 BITS
   03632'041000            STA    0,0,2
   03633'050416            STA    2,HCOMF
   03634'054416            STA    3,HCOMF+1
   03635'006416            JSR    @HCOMF+2
   03636'101000            NOP 17 03637'030412            LDA    2,HCOMF
18 03640'034412            LDA    3,HCOMF+1
19 03641'014172-           DSZ    HADCT
20 03642'000762            JMP    HCOMD
21 03643'030163-           LDA    2,ANOMT          ;RUN SCHED UNLESS NOM ACTIVE
22 03644'020400            LDA    0,PSTAT,1
23 03645'103056            SNEGZ  0,0
24 03646'002006$           JMP    @NMASTR
25 03647'002401            JMP    @.+1
26 03650'002676'           INTN2
27 03651'000000  HCOMF:    0
28 03652'000000            0
29 03653'000277'           ADHOC
30 03654'003654' HTIMT:    .
31 03655'000040            40               ;32 MINUTES
32 03656'000020            20               ;16 MINUTES
33 03657'000013            13               ;11 MINUTES
```

```
:4 03A60'000010            10              ;8 MINUTES
:5 03551'003662'           .+1
:6 03552'000000 HSCHT:     0               ;# OF BITS TO SCHEDULE
:7 03563'000000            0               ;ADDR
:8 03564'000001            1               ;PERIOD - CONTINUOUS
:9 03565'000000            0               ;DURATION
```

DEF

```
0048 $NOTE
                    ;DEF, AAA, NNN
                    ;AAA IS REMOTE ID
                    ;NNN IS IS REMOTE ADDR IN OCTAL
04516'020051$DEF:   LDA    0,PARCT    ;GET PARAMETER COUNT
04517'101015       SNZ    0,0
04520'006012-      JSR    @AQUES
04521'014051$      DSZ    PARCT
04522'000402       JMP    .+2
04523'006012-      JSR    @AQUES
04524'014051$      DSZ    PARCT
04525'006012-      JSR    @AQUES
04526'032001$      LDA    2,@APATA   ;GET     .PARA ADDRESS
04527'006435       JSR    @AALD      ;GET REMOTE ID
04530'101000       NOP
04531'020130-      LDA    0,SYSSZ    ;VERIFY SIZE
04532'142433       SLE    2,0
04533'006012-      JSR    @AQUES
04534'034001$      LDA    3,APATA
04535'025401       LDA    1,1,3      ;GET SECOND PARA
04536'101112       SPOS   0,0
04537'006012-      JSR    @AQUES
04540'020055-      LDA    0,BT5
04541'122033       SLT    1,0
04542'006012-      JSR    @AQUES
04543'034152-      LDA    3,ARADT
04544'040024       STA    0,INDX5                ;CHECK FOR ID DEFINED
04545'054023       STA    3,INDX4
04546'014023       DSZ    INDX4
04547'022023       LDA    0,@INDX4
04550'112415       SNE    0,2
04551'000406       JMP    DEF1
04552'014024       DSZ    INDX5
04553'000774       JMP    .-4
04554'137000       ADD    1,3
04555'051400       STA    2,0,3     ;STA REMOTE ID IN ADDR TABLE
04556'002033$      JMP    @AHRET
04557'020023 DEF1: LDA    0,INDX4   ;IN USE - OK IF SAME DEF
04560'162400       SUB    3,0
04561'106414       SEQ    0,1
04562'006052       PQUES
04563'002033$      JMP    @AHRET
```

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A method of meteor burst radio communication, comprising the steps of:

generating a first polling code which polls a group of remote stations;

transmitting said polling code;

receiving, by means of signals reflected from meteor trails, said transmitted first polling code at a plurality of said remote stations of said group;

transmitting response signals from at least some of said remote stations receiving said transmitted first polling code; and receiving said response signals, selecting a subset of said group of remote stations depending upon which said response signals have been received, namely, said subset including at least one of the remote stations of said group from which a response signal has not been received, and generating for transmission a second polling code, which polls those remote stations in said subset.

2. A method of radio wave communication under highly variable radio communication conditions, comprising the steps of:

generating a first polling sequence comprising a series of probes, each probe including a specific binary code of a predetermined number of bits;

transmitting each probe in said polling sequence for a predetermined period of time;

receiving, by means of signals reflected from meteor trails, said transmitted probes at a plurality of remote stations;

transmitting respective response signals from each of the receiving remote stations polled by the binary code included in said each probe; and receiving said respective response signals, selecting a group of specific remote stations in dependence upon the identification of those remote stations responding, and generating a new polling sequence for polling said specific remote stations, comprising a new series of probes, each being a specific binary code of a number of bits different from that in each of said probes of the first polling sequence, to thereby define said specific remote stations in said group.

3. The method of claim 2, wherein said number of bits in the probes of said new polling sequence is reduced, to increase the number of remote stations polled.

4. The method of claim 2, wherein said number of bits in the probes of said new polling sequence is increased, to reduce the number of remote stations polled.

5. A meteor burst radio communication system comprising:

a plurality of remote stations and a master station including:

means for generating a first polling code which polls a group of said remote stations and means for transmitting said polling codes, said remote stations including:

means for receiving, by means of signals reflected from meteor trails, said transmitted first polling code at a plurality of said remote stations of said group and means for transmitting response signals from at least some of said remote stations receiving said transmitted first polling code, said master station further including means for receiving said response signals, selecting a subset of said group of remote stations depending upon which said response signals have been received, namely, said subset including at least one of the remote stations of said group from which a response signal has not been received, and generating for transmission a second polling code, which polls those remote stations in said subset.

* * * * *